US012363256B2

(12) United States Patent
Minoshima et al.

(10) Patent No.: US 12,363,256 B2
(45) Date of Patent: Jul. 15, 2025

(54) IMAGE CAPTURING APPARATUS, IMAGE PROCESSING APPARATUS, METHODS FOR CONTROLLING THESE AND STORAGE MEDIUM

(71) Applicant: CANON KABUSHIKI KAISHA, Tokyo (JP)

(72) Inventors: Toshio Minoshima, Kanagawa (JP); Hidetaka Uemura, Kanagawa (JP); Koichi Kumagai, Saitama (JP); Makoto Yokozeki, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 131 days.

(21) Appl. No.: 18/158,224

(22) Filed: Jan. 23, 2023

(65) Prior Publication Data

US 2023/0247172 A1    Aug. 3, 2023

(30) Foreign Application Priority Data

Jan. 28, 2022   (JP) .................. 2022-012030

(51) Int. Cl.
*H04N 5/91* (2006.01)
*H04N 5/77* (2006.01)
*H04N 23/667* (2023.01)
*H04N 23/80* (2023.01)

(52) U.S. Cl.
CPC .............. *H04N 5/91* (2013.01); *H04N 5/77* (2013.01); *H04N 23/667* (2023.01); *H04N 23/80* (2023.01)

(58) Field of Classification Search
CPC ........ H04N 5/91; H04N 23/667; H04N 23/80; H04N 5/77
See application file for complete search history.

(56) References Cited

U.S. PATENT DOCUMENTS

2023/0077731 A1*  3/2023  Takahashi ............ H04N 25/772
                                                              382/276

FOREIGN PATENT DOCUMENTS

| JP | 2004265459 A  | 9/2004 |
| JP | 2017219591 A  | 12/2017 |
| JP | 2019062369 A  | 4/2019 |
| WO | 2021261106 A1 | 12/2021 |

* cited by examiner

*Primary Examiner* — Mishawn N. Hunter
(74) *Attorney, Agent, or Firm* — Canon U.S.A., Inc. IP Division

(57) ABSTRACT

An image capturing apparatus performs generating metadata related to capturing by an image capture element for each video frame of the video, and outputting a video frame to which the generated metadata has been added, wherein the generated metadata includes information indicating a delay amount based on a difference between a video frame that the generated metadata corresponds to and a video frame that is outputted after the generated metadata is added thereto in the outputting.

8 Claims, 22 Drawing Sheets

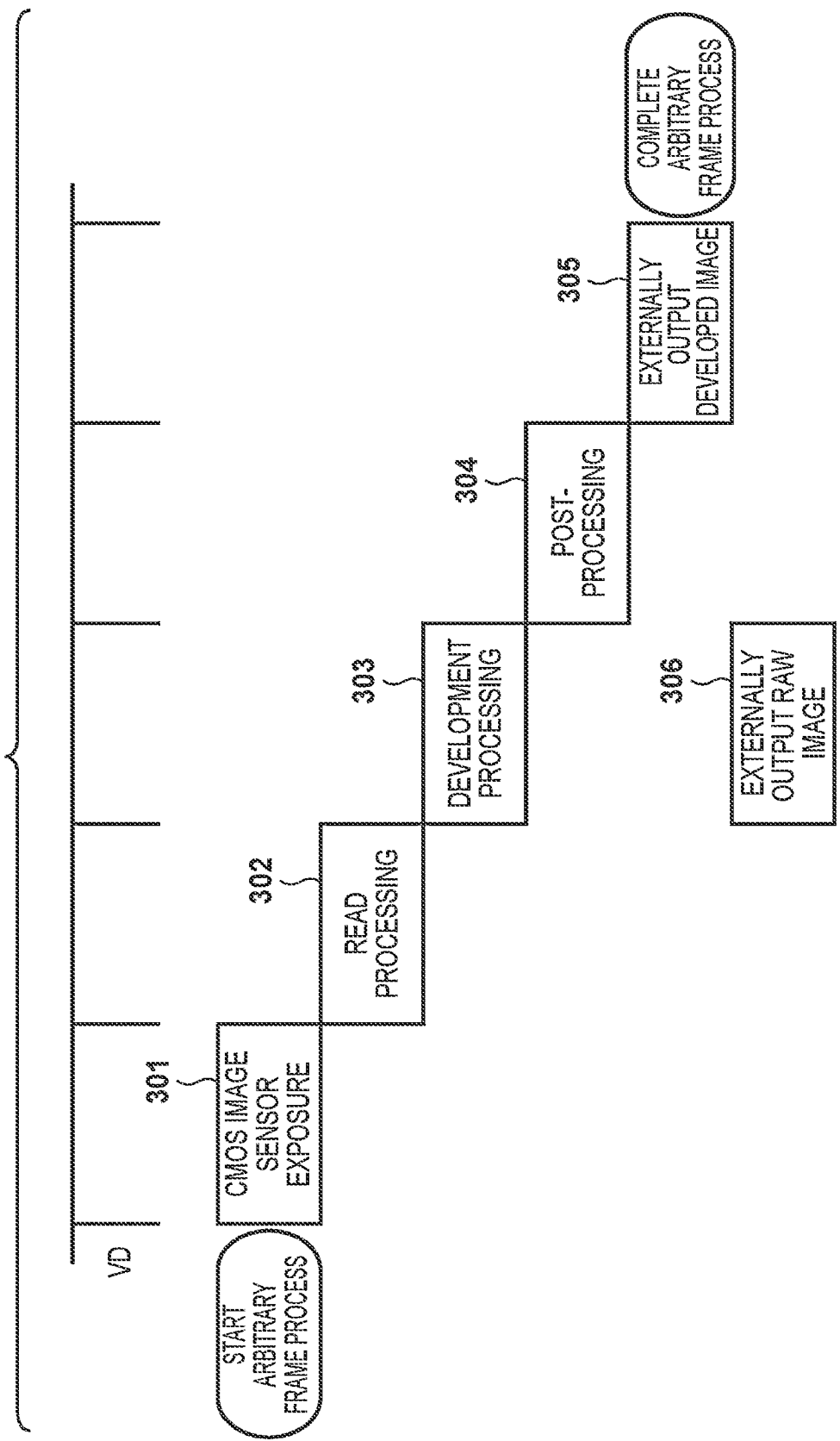

FIG. 4

| CLASS | DETAILS | |
|---|---|---|
| 401 — MANAGEMENT INFORMATION | TimeCode | |
| ... | | |
| 402 — EXPOSURE INFORMATION | SHUTTER | |
| | GAIN | |
| | APERTURE | |
| | FRAME DELAY AMOUNT | ~411a |
| 403 — LENS INFORMATION | FOCUS POSITION | |
| | ZOOM POSITION | |
| | FRAME DELAY AMOUNT | ~411b |
| 404 — FACE DETECTION INFORMATION | NUMBER OF FACE DETECTIONS | |
| | FACE DETECTION POSITION | |
| | FRAME DELAY AMOUNT | ~411c |
| 405 — ELECTRONIC IMAGE STABILIZATION INFORMATION | OPTICAL CENTER POSITION | |
| | ELECTRONIC MAGNIFICATION RATE | |
| | FRAME DELAY AMOUNT | ~411d |
| ... | | |

400

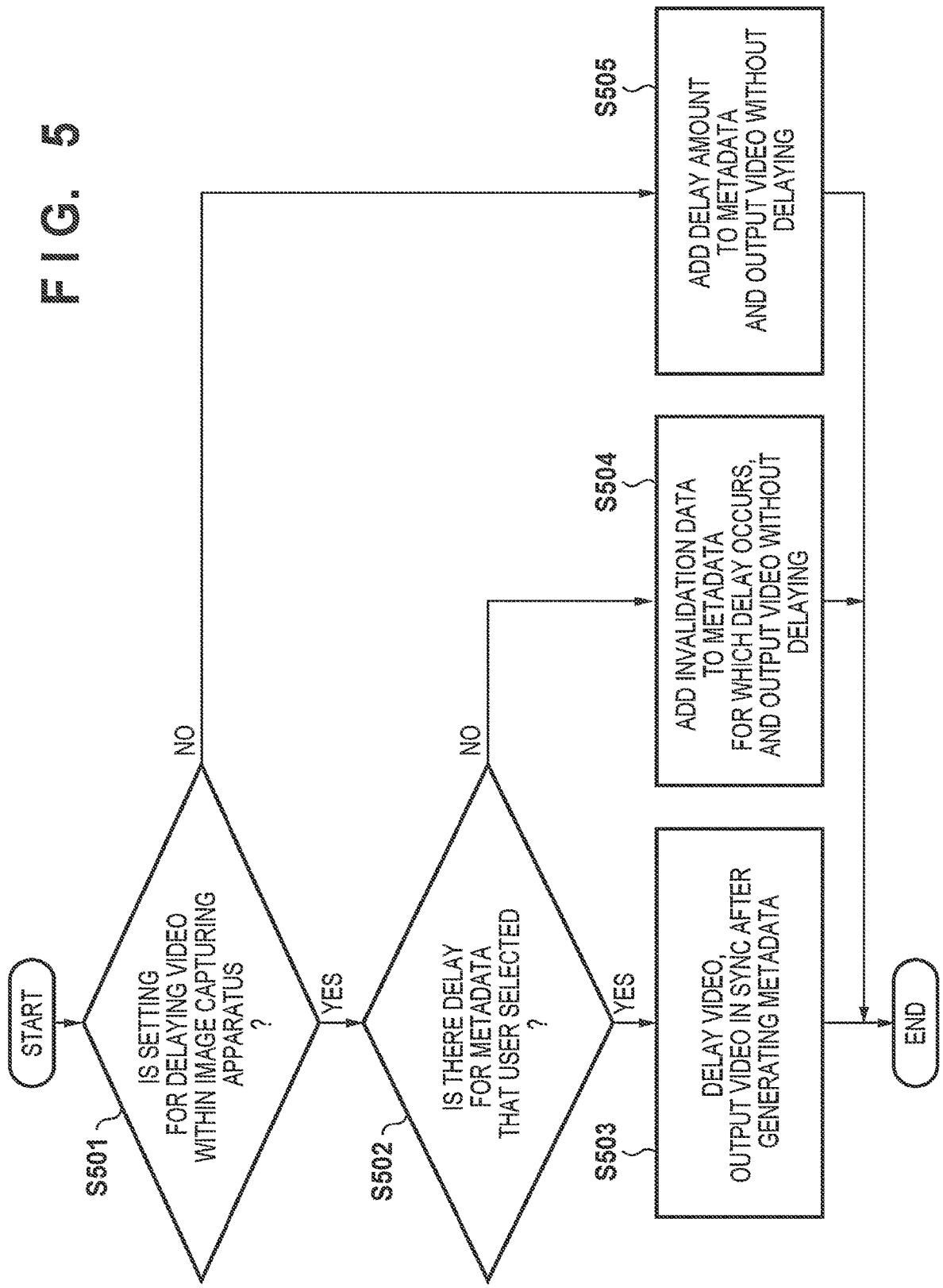

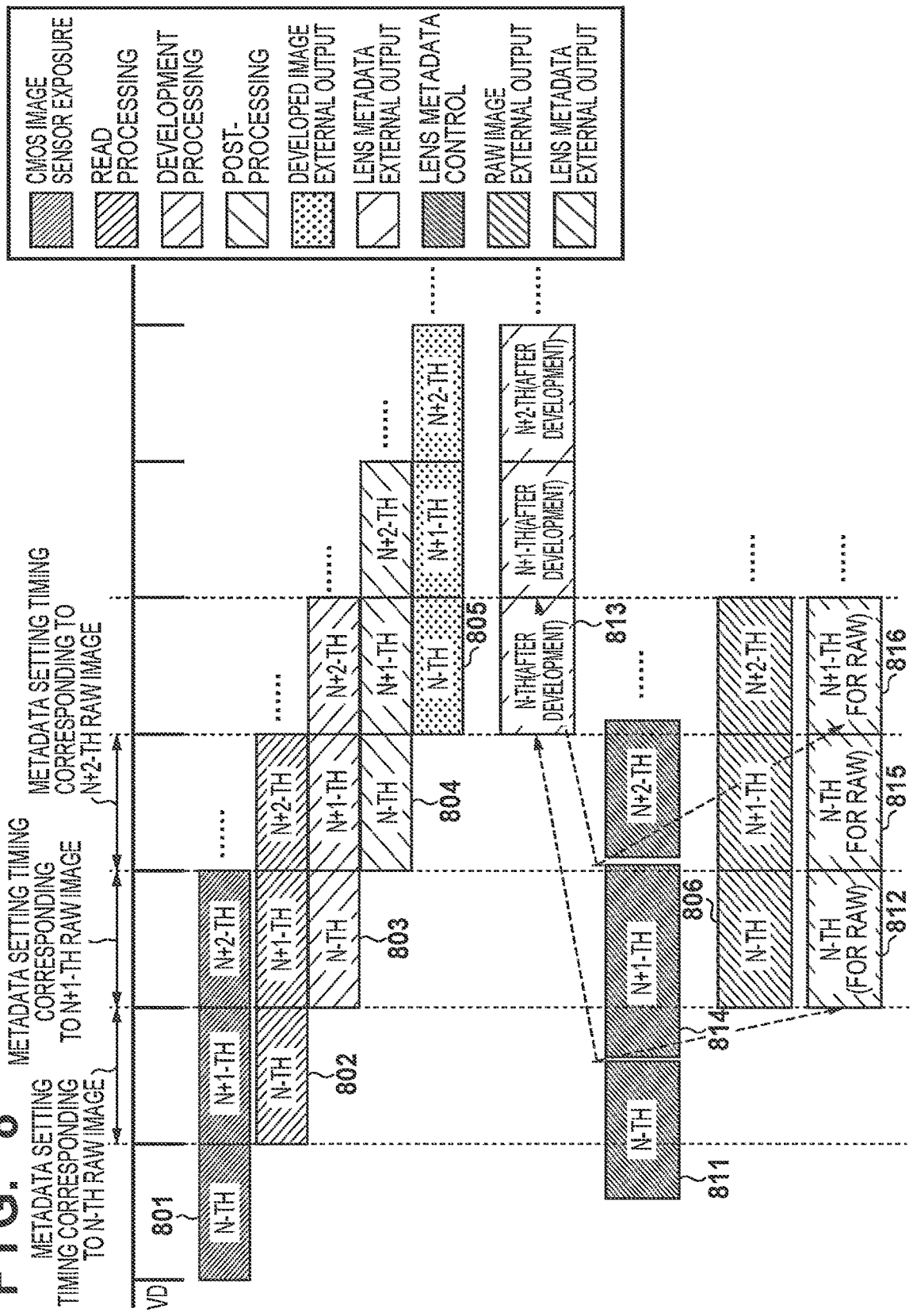

FIG. 9

| | CLASS | DETAILS | DELAY ADJUSTMENT POSSIBLE |
|---|---|---|---|
| 401 | MANAGEMENT INFORMATION | TimeCode | ✕ |
| | ... | | |
| 402 | EXPOSURE INFORMATION | SHUTTER | ✕ |
| | | GAIN | ✕ |
| | | APERTURE | ✕ |
| | | ... | |
| 403 | LENS INFORMATION | FOCUS POSITION | ◯ |
| | | ZOOM POSITION | ◯ |
| | | VERTICAL ANGLE OF VIEW | ◯ |
| | | HORIZONTAL ANGLE OF VIEW | ◯ |
| | | POSITION OF ENTRANCE PUPIL | ◯ |
| | | DISTORTION DATA | ◯ |
| | | ... | |
| 404 | FACE DETECTION INFORMATION | NUMBER OF FACE DETECTIONS | ✕ |
| | | FACE DETECTION POSITION | ✕ |
| | | ... | |
| 405 | ELECTRONIC IMAGE STABILIZATION INFORMATION | OPTICAL CENTER POSITION | ◯ |
| | | ELECTRONIC MAGNIFICATION RATE | ◯ |
| | | ... | |
| | ... | | |

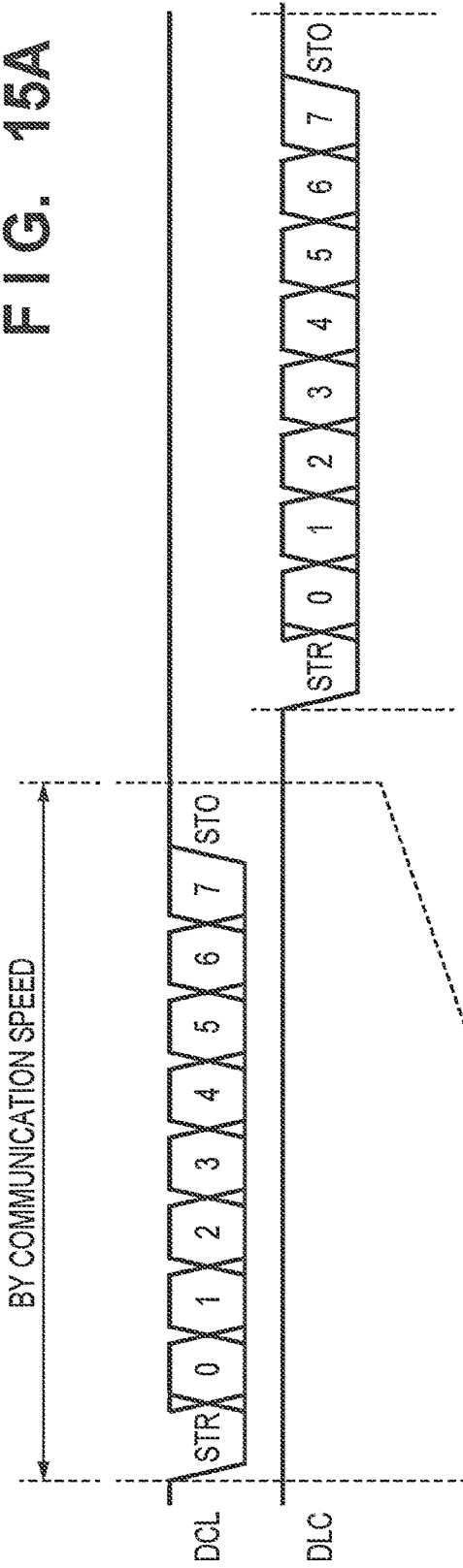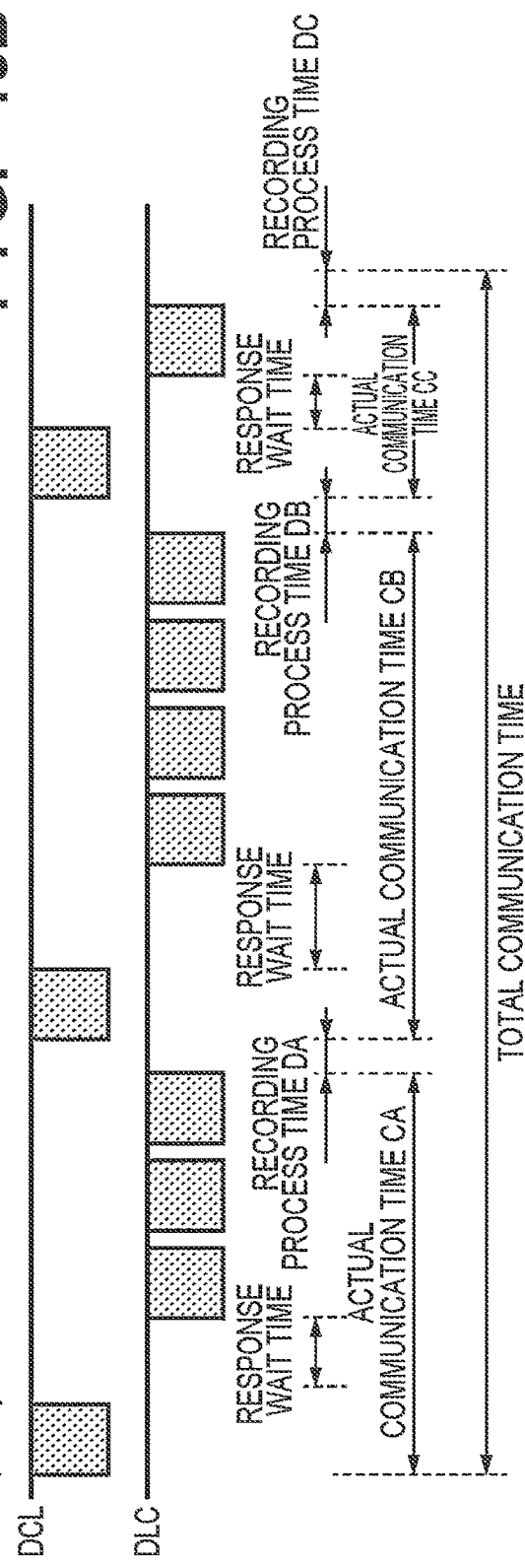

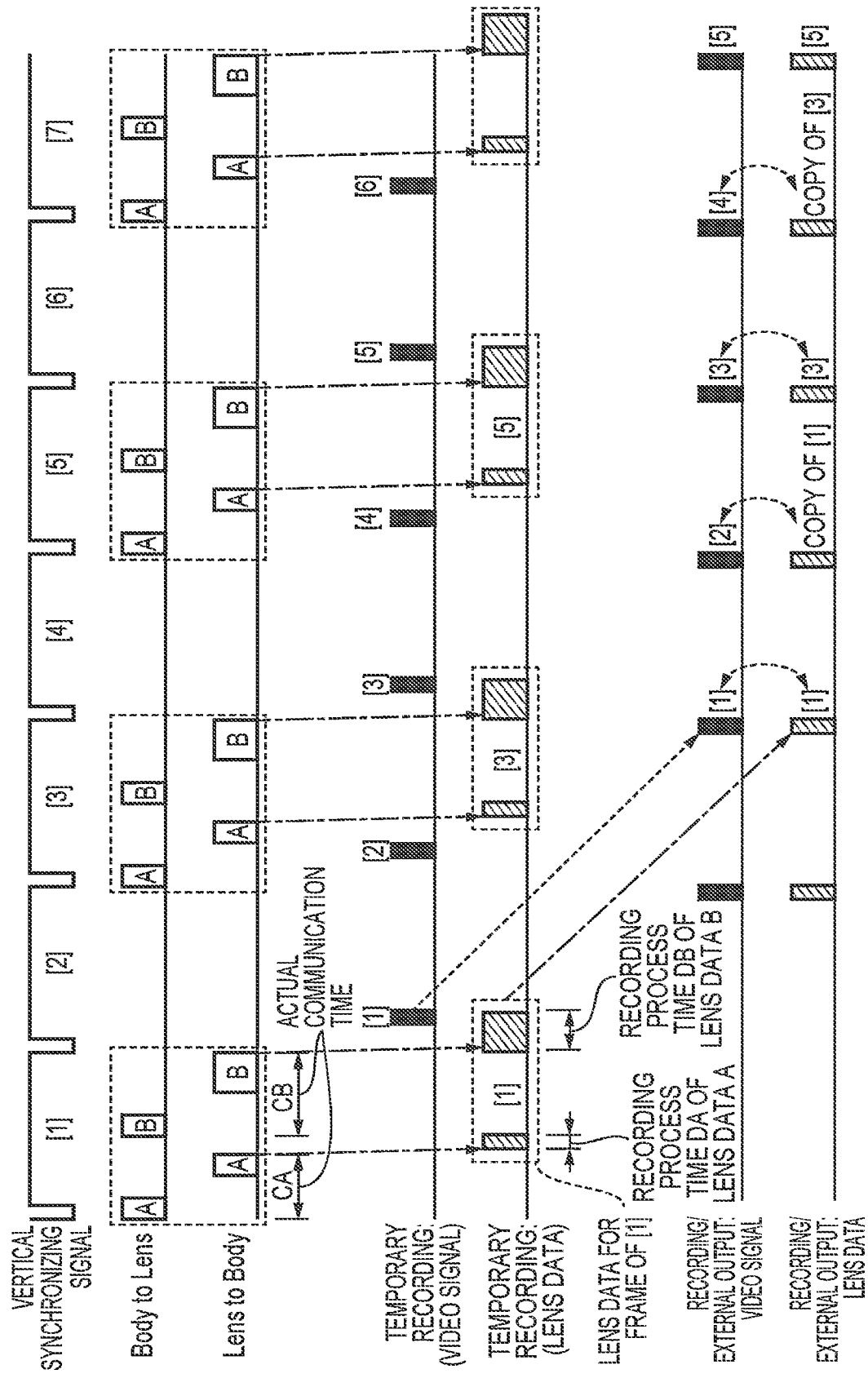

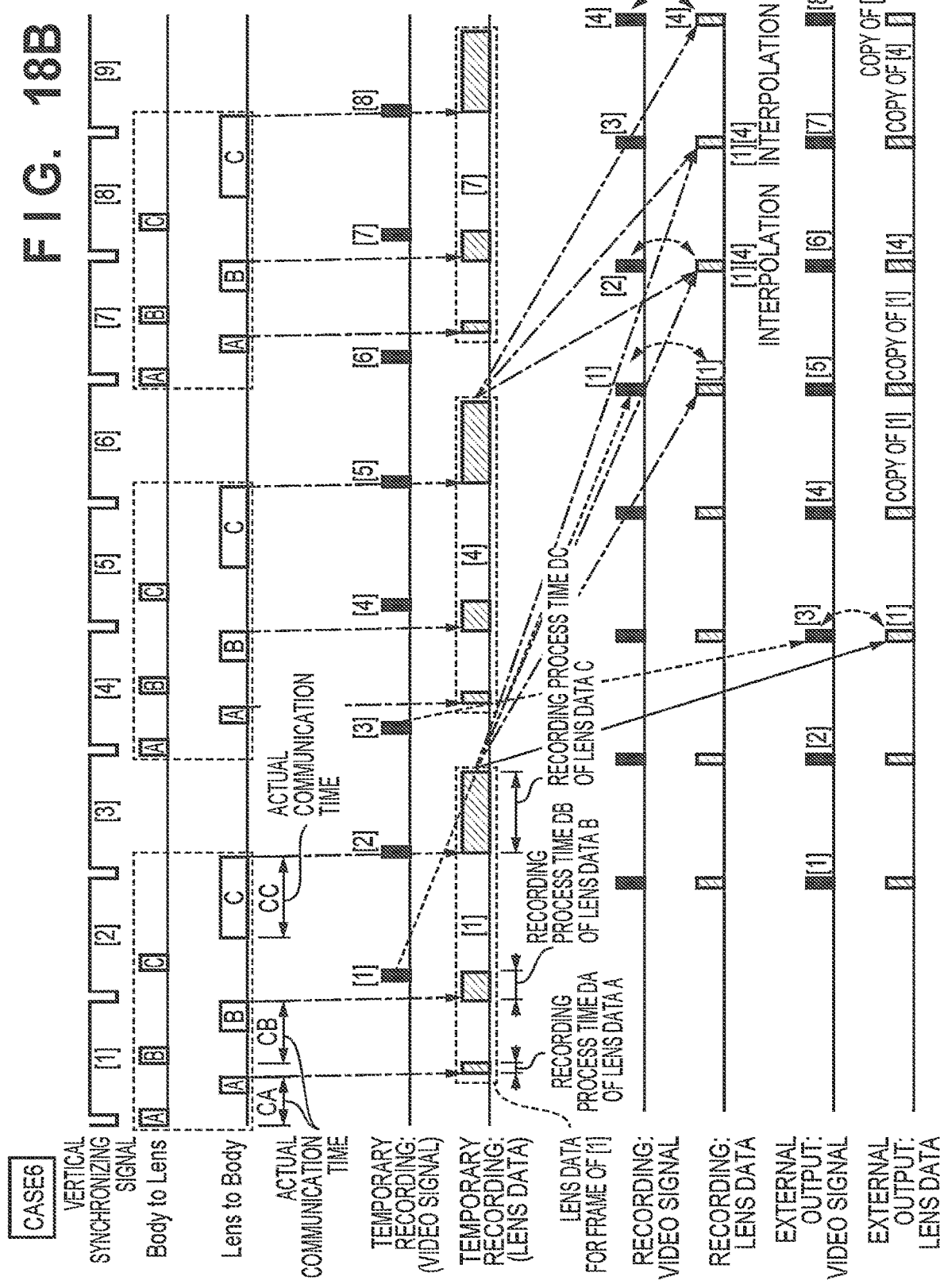

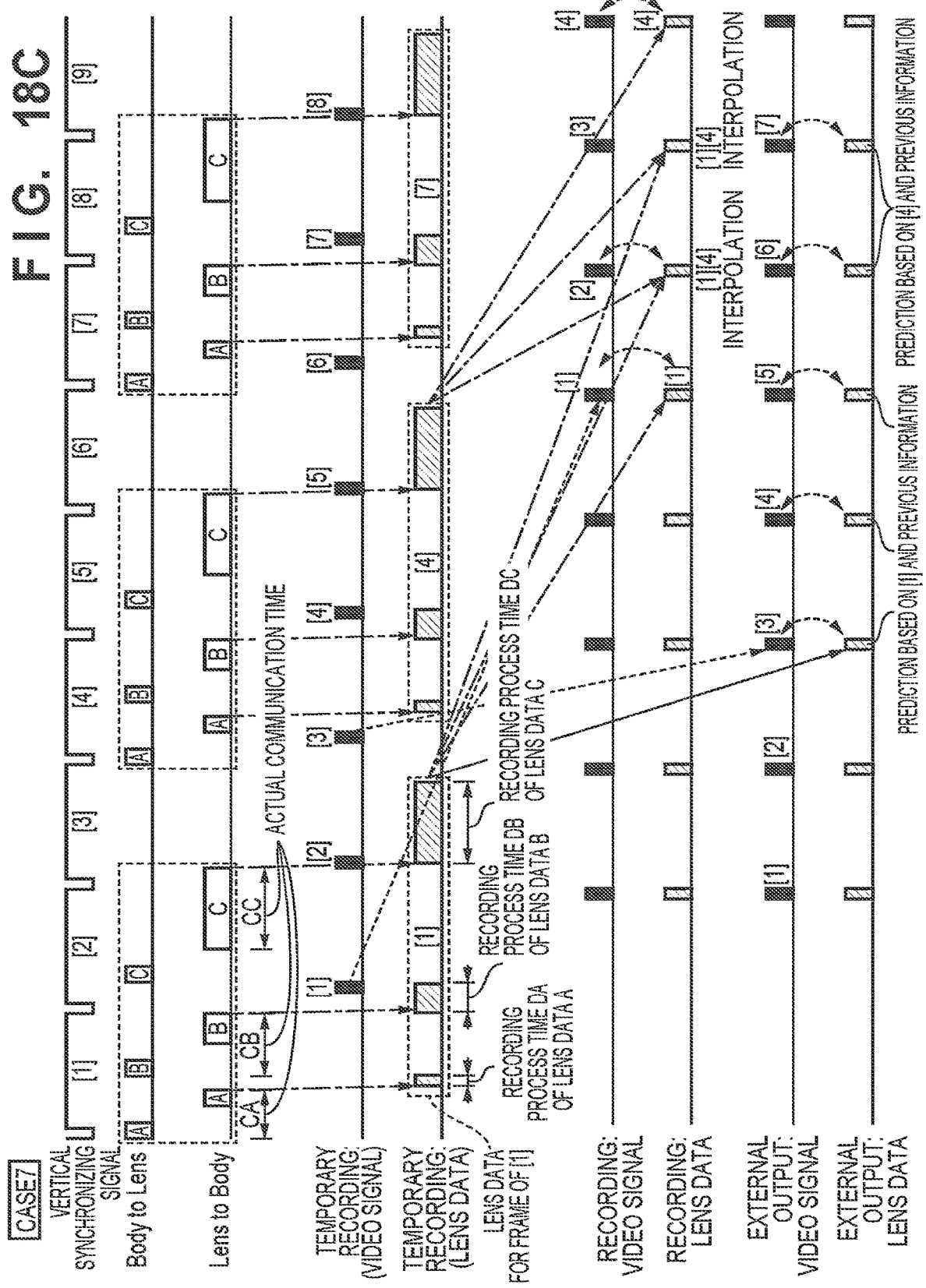

IMAGE CAPTURING APPARATUS, IMAGE PROCESSING APPARATUS, METHODS FOR CONTROLLING THESE AND STORAGE MEDIUM

BACKGROUND

Field

The present disclosure relates to an image capturing apparatus, an image processing apparatus, methods for controlling these, and a storage medium.

Description of the Related Art

In recent years, in the field of video production, a technique called visual effects (hereinafter, VFX) has attracted attention. VFX realizes an unrealistic screen effect (visual effect) by synthesizing computer graphics (hereinafter, referred to as CG) and live-action video. Typically, the synthesis of CG and live-action video is performed at a post-production stage after image capturing. However, in recent years, there has been an increasing need to create the CG first, and perform image capturing while confirming in real time a video in which the CG and a live-action video have been synthesized. When CG and live-action video are synthesized, image capturing parameters (hereinafter, metadata) output together with each frame of the live-action video is used.

However, there are cases where synchronization between metadata and video cannot be achieved due to system limitations for image signal processing, lens communication characteristics that differ for each lens mounted in an interchangeable-lens-type image capturing apparatus, and the like. If the metadata and the video cannot be synchronized, it becomes impossible to correctly reference the metadata when CG is synthesized in real time. Japanese Patent Laid-Open No. 2004-265459 discloses a configuration in which each of a video signal/audio signal and auxiliary information attached thereto are provided in a memory unit, and the relatedness between the video signal/audio signal and the auxiliary information is thereby maintained.

However, in the technique recited in Japanese Patent Laid-Open No. 2004-265459 there is a need to delay the video in the image capturing apparatus. Therefore, it is necessary to mount a dedicated large-capacity memory for storing the video to be delayed. Recently, many products equipped with a RAW video recording function and products that output RAW video from external output terminals such as SDI (Serial Digital Interface) and HDMI® (High-Definition Multimedia Interface) have been released. In a case where this type of video signal is caused to be delayed, a large-capacity memory is needed, and therefore it is difficult to suppress an increase in a manufacturing cost of the image capturing apparatus. In addition, if the video is delayed in the image capturing apparatus, there is the possibility that a desired real-time property of the synthesized image will not be obtained.

SUMMARY

The present disclosure provides a technique for reducing delay in video output to which metadata is added.

According to one embodiment of the present disclosure, there is provided an image capturing apparatus, comprising: an image capture element configured to capture a video; at least one memory storing instructions; and at least one processor that, upon executing the stored instructions, performs: generating metadata related to the capturing by the image capture element for each video frame of the video; and outputting a video frame to which the generated metadata has been added, wherein the generated metadata includes information indicating a delay amount based on a difference between a video frame that the generated metadata corresponds to and a video frame that is outputted after the generated metadata is added thereto in the outputting.

Further features of the present disclosure will become apparent from the following description of example embodiments with reference to the attached drawings.

BRIEF DESCRIPTION OF THE DRAWINGS

FIG. 3 is a diagram for explaining a flow of video signal processing in the image capturing apparatus and a problem therewith.

FIG. 4 is a diagram illustrating an example of metadata according to the first embodiment.

FIG. 5 is a flowchart illustrating processing of video output by the image capturing apparatus according to the first embodiment.

FIG. 8 is a diagram for explaining a flow of video signal processing in the image capturing apparatus and a problem therewith.

FIG. 9 is a diagram illustrating an example of metadata according to a second embodiment.

FIGS. 15A and 15B are diagrams for explaining asynchronous serial communication.

FIGS. 17A to 17D are views illustrating an association between video signals and lens data according to the third embodiment.

FIGS. 18A to 18C are views illustrating an association between video signals and lens data according to a fourth embodiment.

DESCRIPTION OF THE EMBODIMENTS

Figure 1:
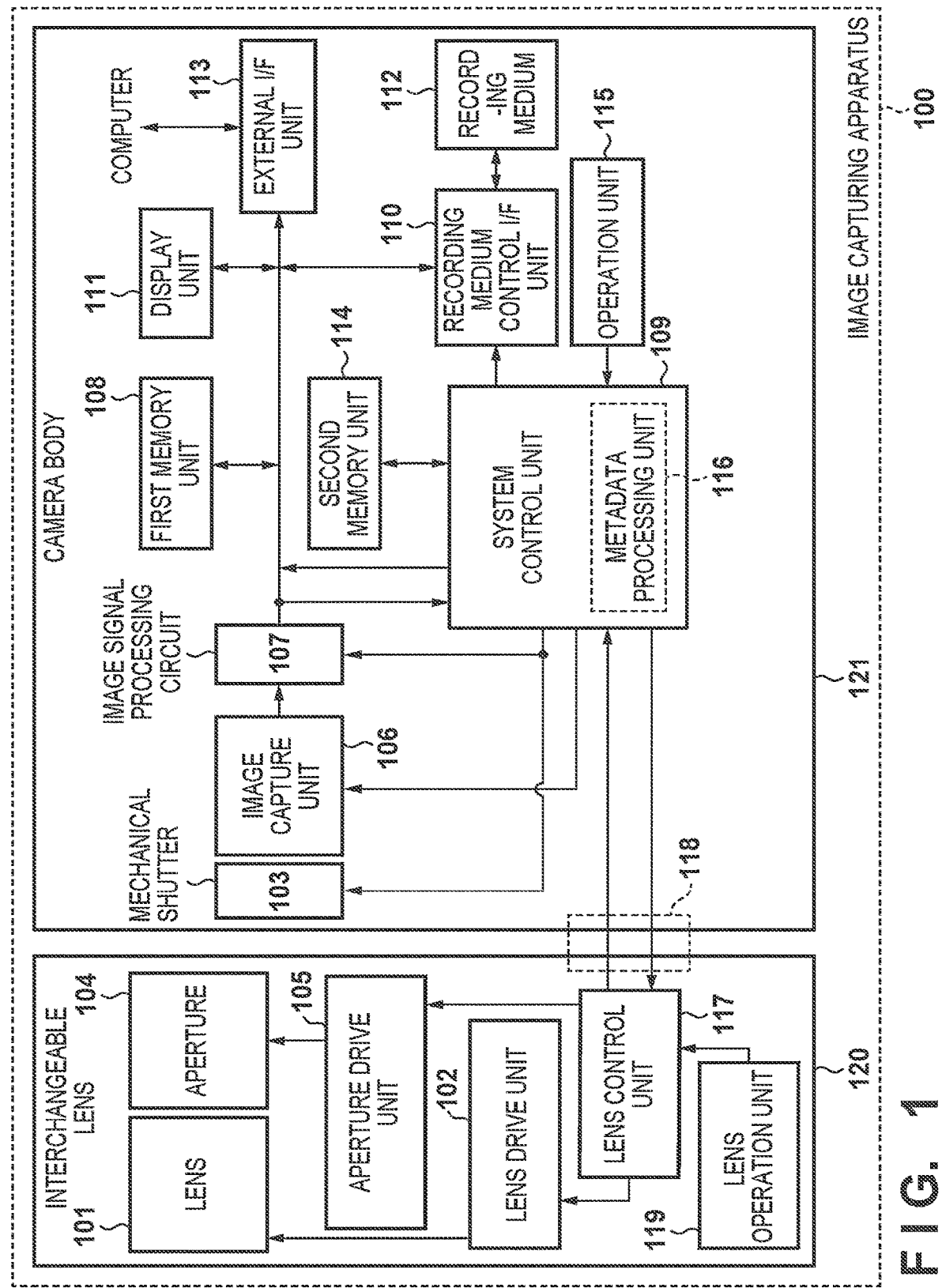
FIG. 1 is a block diagram illustrating a configuration example of an image capturing apparatus according to a first embodiment.

Hereinafter, embodiments will be described in detail with reference to the attached drawings. Note, the following embodiments are not intended to limit the scope of the claimed invention. Multiple features are described in the embodiments, but limitation is not made to embodiments that requires all such features, and multiple such features may be combined as appropriate. Furthermore, in the attached drawings, the same reference numerals are given to the same or similar configurations, and redundant description thereof is omitted.

First Embodiment

In the following embodiments, control for recording and reproducing a moving image by an image capturing apparatus 100, and particularly, a method for controlling metadata for use in a real-time synthesizing process in a VFX will be described. FIG. 1 is a block diagram illustrating a configuration example of the image capturing apparatus 100. The image capturing apparatus 100 includes a camera body 121 and an interchangeable lens 120 that is attachable to and detachable from the camera body 121.

A lens 101 is driven and controlled by a lens drive unit 102 to perform zooming, focusing, and the like. The subject image, after having passed through the lens 101, is adjusted to an appropriate amount of light by an aperture 104, and is imaged on an image capturing surface of an image capture element included in an image capture unit 106. The aperture 104 is driven and controlled by an aperture drive unit 105. The image capture element photoelectrically converts a subject image coupled to an image capturing surface. The image capture unit 106 reads out the photoelectrically-converted subject image from the image capture element, adjusts the gain, and then converts the subject image into a digital signal by A/D conversion that converts an analog signal into the digital signal. Digital signals (e.g., R, Gr, Gb, and B signals) of the subject image thus obtained are sent from the image capture unit 106 to an image signal processing circuit 107. The image signal processing circuit 107 performs various types of image signal processing such as development processing, low-pass filtering for reducing noise, shading processing, white balance (WB) processing, and cyclic NR processing. The image signal processing circuit 107 further performs various kinds of correction, compression of image data, and the like.

A system control unit 109 includes one or a plurality of processors, and controls the image capturing apparatus 100 as a whole and performs various calculations. Further, the system control unit 109 transmits various commands to a lens control unit 117 via an electric contact unit 118. In addition, the system control unit 109 makes a request to the interchangeable lens 120 (the lens control unit 117) that the interchangeable lens 120 transmit lens information (such as optical information). Further, the system control unit 109 controls driving of a mechanical shutter 103. A first memory unit 108 temporarily stores image data. A recording medium control I/F unit 110 is an interface for recording or reading image data to or from a recording medium 112. A display unit 111 includes, for example, a liquid crystal display and displays image data. The recording medium 112 is a removable recording medium such as a semiconductor memory, and records image data. An external I/F unit 113 is an interface for communicating with an external computer or the like. A second memory unit 114 stores various programs executed by the processor of the system control unit 109, calculation results of the system control unit 109, and the like.

An operation unit 115 receives various operations by the user. Information on driving conditions of the image capturing apparatus 100 set by the user via the operation unit 115 is sent to the system control unit 109. The system control unit 109 controls the image capturing apparatus 100 as a whole based on these pieces of information. A metadata processing unit 116 stores image capturing parameters associated with the image data in a predetermined storage region (for example, the second memory unit 114).

The electric contact unit 118 includes electric contacts (a camera terminal/a lens terminal) corresponding to two communication lines provided in each of the interchangeable lens 120 and the camera body 121. The lens control unit 117 communicates with the camera body via the electric contact unit 118. Further, the lens control unit 117 controls driving of the lens drive unit 102 and the aperture drive unit 105 in accordance with operation information from a lens operation unit 119. Further, the lens control unit 117 communicates with the camera body 121 via the electric contact unit 118, and receives commands from the system control unit 109 and transmits lens information (optical information or the like) based on received commands. The lens operation unit 119 is provided with operation members such as a zoom operation ring, a focus operation ring, and an aperture drive ring. When each operation member is operated by the user, an operation signal is outputted to the lens control unit 117. The lens control unit 117 performs control in response to the corresponding operation, in accordance with this operation signal.

Figure 2:
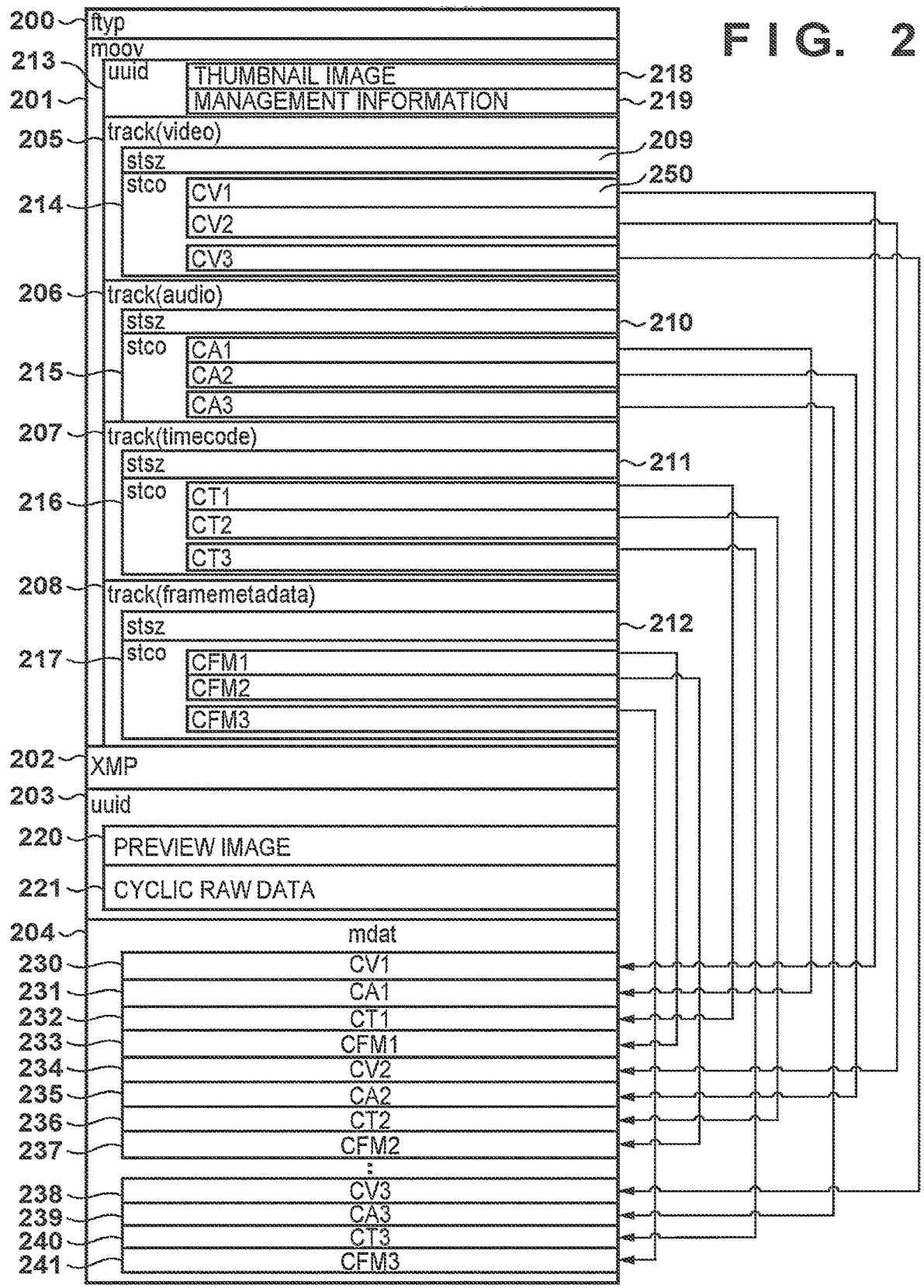
FIG. 2 is a diagram illustrating an example of a format of a video file according to the first embodiment.

FIG. 2 is a diagram illustrating an example of a format of a video file according to the present embodiment. An ftyp box 200 stores information indicating compatibility of the file format. An moov box 201 stores management information needed for reproduction and a thumbnail image. An XMP box 202 stores XMP. Any metadata can be set in the XMP box 202. Note that XMP denotes Extensible Metadata Platform. A uuid box 203 stores additional arbitrary information. Arbitrary information can be added by the uuid box 203. For example, for RAW video, the uuid box 203 may store a preview image 220. An mdat box 204 stores encoded video data, audio data, time code data, and metadata in units of video frames. In the following description, a video frame is also simply referred to as a frame.

Next, the configuration of the moov box 201 will be described. A uuid box 213 stores additional arbitrary information. In the illustrated example, the uuid box 213 stores a thumbnail image 218 to be displayed at the time of reproduction and management information 219 to be used at the time of reproduction. track boxes 205 to 208 store management information related to video data, audio data, time code data, and metadata in units of frames. The track boxes 205 to 208 have stsz boxes 209 to 212 and stco boxes 214 to 217, respectively. The stsz boxes 209 to 212 store data sizes for each of video data, audio data, time code data, and encoding units for frame-unit metadata. Each of the stco boxes 214 to 217 stores information indicating a storage position in the mdat box 204 of video data, audio data, time code data, and frame-unit metadata. Each piece of data of the video data, audio data, time code data, and metadata is stored in the mdat box 204 in a unit called a chunk composed of one or more encoding units.

The mdat box 204 stores video data 230, 234, . . . , audio data 231, 235, . . . , time code data 232, 236, . . . , and frame-unit metadata 233, 237, . . . . Each piece of data in the mdat box 204 may be accessed in units of chunks according to values described in a stco box. For example, the video data 230 (CV1) can be traced from the storage location information 250 of the stco box 214.

Next, an operation of the image capturing apparatus 100 according to the present embodiment having the above configuration will be described. In the following, a problem related to synchronization of video signals and metadata that occurs when RAW video is outputted from an external output terminal such as an SDI or HDMI (registered trademark) terminal will be described first. Next, a configuration of the first embodiment for solving such a problem will be described. In the first embodiment, it is possible to synchronize the video signal and the metadata without using a configuration in which the video is caused to be delayed by using a large-capacity memory.

FIG. 3 is a diagram for explaining a flow of video signal processing and a problem to be solved by the present embodiment. In video signal processing of a video frame N, first, in step 301, exposure is performed by an image capture element (CMOS sensor) of the image capture unit 106. Next, in step 302, an exposure image is read from an image capture element, and a RAW image is acquired by performing a gain adjustment, an A/D conversion, and the like. The acquired RAW image is provided to a first path (step 303 to step 305) in which the image is outputted after passing through a development process and a second path (step 306) in which the image is externally outputted directly. In the first path, the development process is performed on the RAW image in step 303, and post-processing is performed on the developed image in step 304 to generate a developed image. Then, in step 305, the developed image is externally outputted from the external I/F unit 113. In the second path, in step 306, the RAW image is outputted from the external I/F unit 113. Generally, in the first path, various image processes such as detection of exposure and color information, detection of a subject, and detection of motion vector amounts to be used for image stabilization are performed based on the acquired RAW image. On the other hand, when a RAW image is externally outputted in step 306, the RAW image is outputted prior to the result of the image processing being obtained. Therefore, in outputting a RAW image, there arises a problem that the image processing result cannot be output together with the video as frame synchronized metadata. In the prior art, a large-capacity memory is provided, and the external outputted of the RAW image in step 306 is delayed to the timing of the external output of the developed image in step 305, for example, so that the image processing result can be output together with the RAW image as metadata.

In contrast, in the first embodiment, by adding new metadata, it is possible to synchronize video and metadata on the side of a downstream image processing apparatus while eliminating the need to delay external output of the RAW image.

FIG. 4 is a diagram illustrating an example of frame-based metadata according to the first embodiment. The metadata is stored, for example, in the mdat box 204. Metadata 400 includes various metadata such as management information 401, exposure information 402, lens information 403, face detection information 404, and electronic image stabilization information 405. For example, the management information 401 includes basic information such as TimeCode. The exposure information 402 includes, for example, information such as a shutter, a gain, and an aperture. The lens information 403 includes, for example, information on a focus lens position and a zoom position. The face detection information 404 includes, for example, information on a face detection position and a number of face detections. The electronic image stabilization information 405 includes, for example, information on an optical center position and an electronic magnification rate. As described above with reference to FIG. 3, the data obtained by image processing of the RAW image is generated later than the timing at which the RAW image is externally outputted (step 306). Therefore, in the present embodiment, by adding data (frame delay amounts 411a to 411d) representing the frame delay amount to the respective metadata, it is possible to match the frame and the metadata in a downstream external image processing apparatus. The delay amount indicates a difference between a video frame corresponding to the generated metadata and a video frame that the generated metadata is added to and outputted. For example, if the face detection information 404 is attached to a frame delayed by one frame, the frame delay amount 411c is set to 1. In the downstream image processing apparatus, the video and the metadata are synchronized by performing development processing in consideration of the delay amount. Although the number of frames is used as the frame delay amount 411, the present invention is not limited to this. For example, the frame delay amount 411 may be represented by time information such as TimeCode information. In this case, the downstream image processing apparatus can synchronize the video and the metadata by considering differences between the TimeCode of the video and the TimeCode of the respective metadata.

FIG. 5 is a flowchart illustrating processing of video output by the image capturing apparatus 100 according to the first embodiment. In the processing illustrated in FIG. 5, the user is enabled to select one of processing of a first mode in which video output is performed using the frame delay amount metadata described in FIG. 4 and processing of a second mode in which video output is performed by delaying the video according to a conventional method. The user can select, via the operation unit 115, which mode of processing in the first mode (processing for setting a frame delay amount in metadata) or processing in the second mode (processing for delaying a video in the image capturing apparatus 100) the image capturing apparatus 100 is to perform. Further, in the present embodiment, the user can select the metadata to be used in the image processing performed by the downstream image processing apparatus.

In step S501, the system control unit 109 determines whether a mode (second mode) for delaying video in the image capturing apparatus 100 is set by a user operation. When the second mode is set, the video is allowed to be delayed in the image capturing apparatus 100, and the video is delayed as necessary before being outputted. In a case where the system control unit 109 determines that the video delay mode is set (YES in step S501), the system control unit 109 advances the process to step S502. In step S502, the system control unit 109 determines whether or not there is metadata for which there is a delay among metadata selected by a user as metadata to be used in downstream image processing. The metadata for which there is a delay is metadata generated later than the timing of the external output (step 306) of the RAW image. If it is determined that there is metadata for which there is a delay (YES in step S502), the system control unit 109 advances the process to step S503. In step S503, the system control unit 109 delays the video by using frame memory, and after metadata corresponding to the video frame is generated, outputs the video frame and the corresponding metadata. In this way, video output for which video and metadata have been synchronized is performed. Note that the second memory unit 114 can be used as the frame memory.

Meanwhile, in a case where it is determined that there is no metadata for which a delay occurs (NO in step S502), the system control unit 109 advances the process to step S504. In step S504, the system control unit 109 adds invalidation data to metadata for which a delay occurs, and outputs the RAW image without performing a delay like that of step S503. As a result, video output without delay is performed. The metadata selected by the user, that is, the metadata used in the downstream image processing is outputted in synchronization with the video. Also, in a case where it is determined in step S501 that the second mode, in which video is caused to be delayed, has not been set (NO in step S501), the system control unit 109 advances the process to step S505. In step S505, the system control unit 109 adds data indicating a delay amount to the metadata for which a delay occurs, and immediately outputs the video (RAW image) without delaying the video. For example, the system control unit 109 sets the number of frames (or TimeCode) as the delay amount in the frame delay amount 411c of the face detection information 404. Note that the frame delay amount is assumed to be set to 0 with respect to metadata for which there is no delay, but the present invention is not limited to this, and for example, metadata for which there is no delay may be such that it does not include data in the frame delay amount.

As described above, when the first mode, in which the video is not delayed, is selected, the system control unit 109 adds data indicating the frame delay amount of each piece of metadata, and outputs the video and the metadata from the image capturing apparatus 100 without delaying the video. Further, even when the second mode, in which the video is delayed, is selected, the user can select the metadata to be used downstream (for example, in an external image processing apparatus), thereby avoiding a video delay caused due to the metadata that is unnecessary to the downstream processing.

Figure 6:
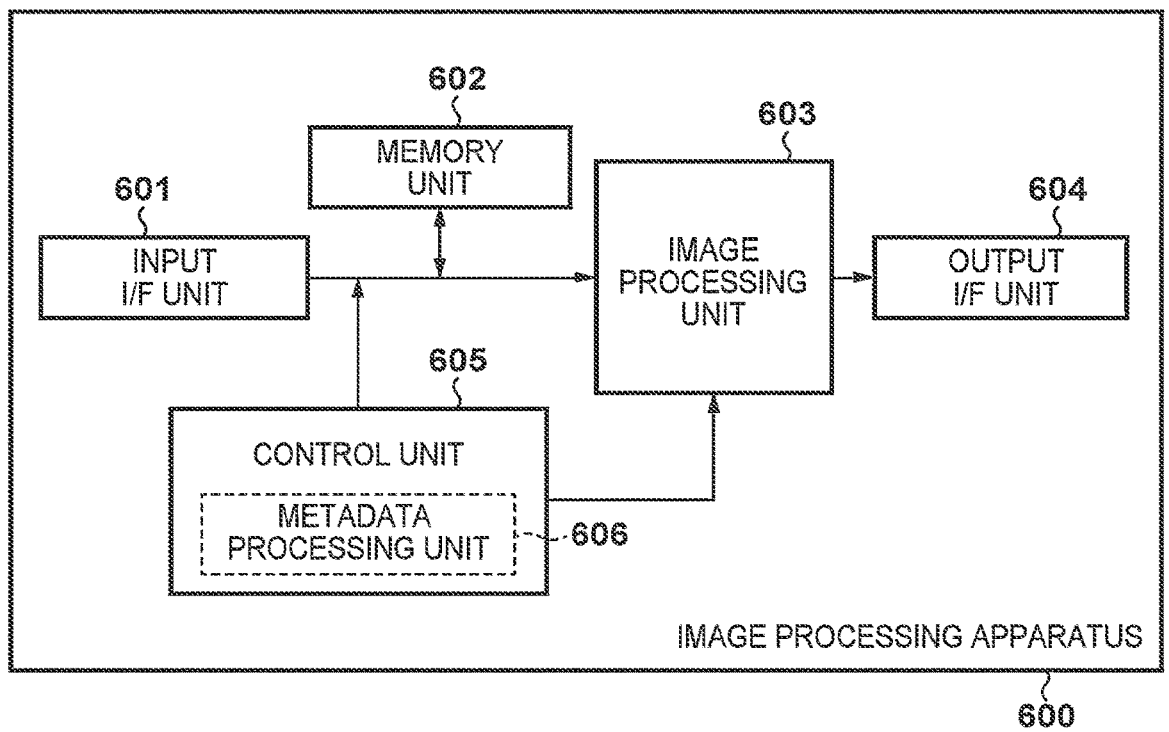
FIG. 6 is a block diagram illustrating a configuration example of an image processing apparatus according to the first embodiment.

FIG. 6 is a block diagram illustrating an example of a configuration of an image processing apparatus 600, which is an example of an external device connected via the external I/F unit 113 of the image capturing apparatus 100. In FIG. 6, an input I/F unit 601 is an interface for receiving a video from an external device (for example, the external I/F unit 113 of the image capturing apparatus 100). A memory unit 602 temporarily records the video (image data) received by the input I/F unit 601. An image processing unit 603 performs image signal processing such as CG synthesis on the inputted video. The image processing unit 603 further performs various corrections, data-compression, and the like on the image obtained by synthesizing CG. An output I/F unit 604 is an interface for outputting a video obtained by CG synthesis to an external device (for example, the image capturing apparatus 100 and a display device (not shown). A control unit 605 includes, for example, a memory in which one or more processors and programs are stored, and controls the entire image processing apparatus 600 and performs various operations by the one or more processors executing the programs stored in the memory. Note that the memory unit 602 may be used as a memory for storing a program. The metadata processing unit 606 analyzes metadata (image capturing parameters and the like) associated with the inputted video data. Note that the image processing unit 603 may be realized as a part of the function of the control unit 605.

Figure 7:
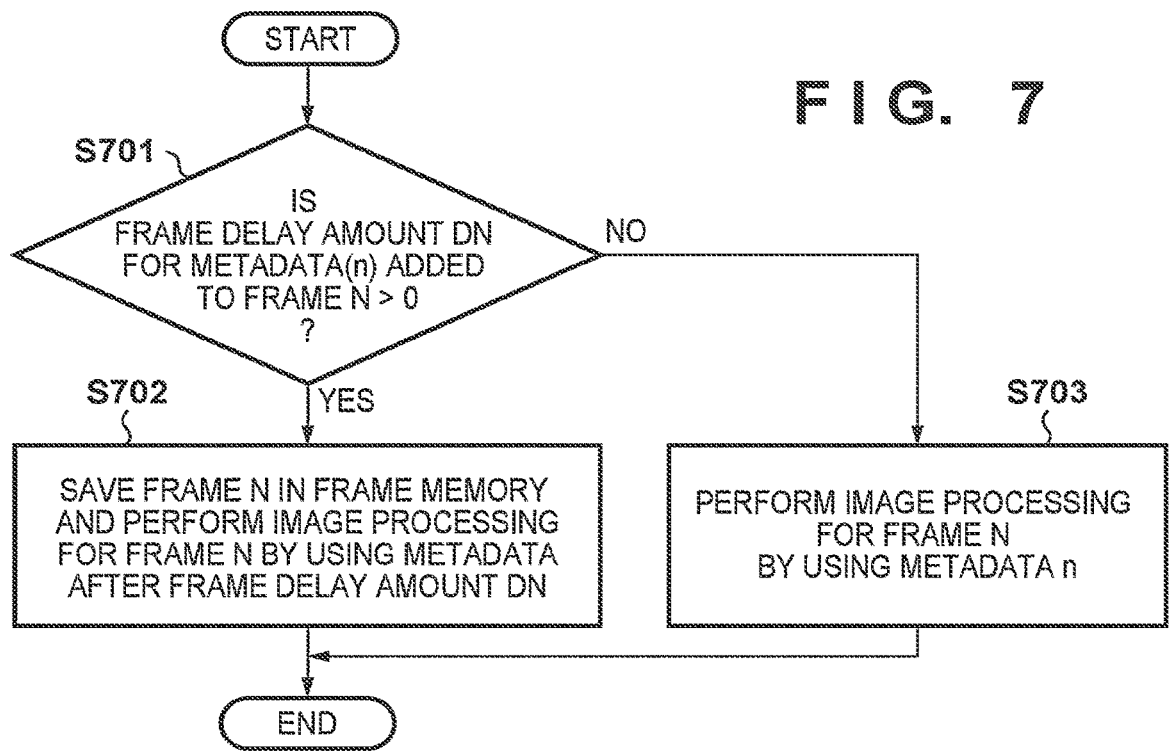
FIG. 7 is a flowchart illustrating processing of the image processing apparatus according to the first embodiment.

FIG. 7 is a flowchart showing an operation of the image processing apparatus 600 at the time of image processing. In step S701, the control unit 605 analyzes metadata n added to an inputted video frame N, and determines whether or not a frame delay amount DN of the metadata n used by the image processing unit 603 is greater than 0. In a case where the control unit 605 determines that the frame delay amount DN is greater than 0 (YES in step S701), the control unit 605 advances the process to step S702. In step S702, the control unit 605 saves the inputted video frame N to the memory unit 602. Then, the control unit 605 controls the image processing unit 603 to perform image processing on the video frame N saved in the memory unit 602 by using the metadata added to a video frame that is later by the frame delay amount DN. Meanwhile, in step S701, in a case where the control unit 605 determines that the frame delay amount DN of metadata n is equal to or less than 0 (NO in step S701), the process proceeds to step S703. In step S703, the control unit 605 controls the image processing unit 603 to execute the image processing of the inputted video frame N using the metadata n inputted together with that frame.

In FIG. 7, although one piece of metadata has been described for the sake of simplicity, the determination is actually performed for all pieces of metadata used for image processing, and the video frames are continuously saved in the memory unit 602 until the metadata having the largest delay amount is inputted. Next, the control unit 605 acquires each piece of metadata from a video frame specified by the frame delay amount, and performs image processing. In addition, when the delay amounts of all the metadata to be used are equal to or less than 0, the determination in step S701 becomes NO, and step S703 is executed. The reason why the delay amount would be set to equal to or less than 0 is that a negative value may be taken when there is metadata that can be generated earlier than the video.

As described above, according to the first embodiment, the image processing apparatus 600 can synchronize a video frame and metadata based on a frame delay amount added to the respective metadata even when the video and the metadata are not synchronized. Therefore, the image capturing apparatus 100 can output the video without delaying the video until the metadata is acquired. Therefore, the delay in the image capturing apparatus 100 is reduced, and the amount of memory for delaying the video is also reduced. In addition, when the image processing speed of the image processing apparatus 600 is higher than the image processing speed of the image capturing apparatus 100, the effect of reducing the video delay of the entire system can be achieved. Also, in the case of a system in which the image processing apparatus 600 performs RAW development and post-processing is performed using the metadata added to a subsequent video frame after the video frame is inputted during development, the image processing can be performed with a further reduction in the video delay. Further, according to the above-described embodiment, even with a setting (the second mode) in which the video is delayed in the image capturing apparatus 100, it is possible to avoid video delay caused by metadata unnecessary to the downstream image processing by the user selecting the metadata to be used in the downstream image processing. For example, when development processing is performed on RAW video outputted from the external I/F unit 113 by the external image processing apparatus 600, a situation in which video output from the image capturing apparatus 100 is delayed due to metadata that is not needed for the development process is prevented. As a result, the video delay of the entire system can be reduced.

Second Embodiment

In the first embodiment, a metadata delay amount is set in the metadata, so as to achieve metadata that is synchronized with RAW video in an external device (the image processing apparatus 600) which receives RAW video from the image capturing apparatus 100. When the timing at which the generation of the metadata is completed changes in the image capturing apparatus 100, the synchronization state and the delay state of the metadata which are outputted together with RAW video from the image capturing apparatus 100 change. When the delay state changes, a difference occurs between the actual delay amount of the metadata and the delay amount set for the metadata, which makes it difficult for the image processing apparatus 600 to correctly associate the video frame with the metadata. This kind of problem is solved in the second embodiment.

The configurations of the image capturing apparatus 100 and the image processing apparatus 600 according to the second embodiment are similar to those of the first embodiment (FIG. 1 and FIG. 6). Information on a condition for driving the image capturing apparatus 100 set by the user via the operation unit 115 and delay information on metadata are sent to the system control unit 109. The system control unit 109 controls the image capturing apparatus 100 as a whole based on these pieces of information. The system control unit 109 of the second embodiment can delay a timing added to the video frame for predetermined metadata in addition to storing image capturing parameters or the like associated with a video frame in a predetermined region.

FIG. 8 is a diagram for explaining a flow of video signal processing in the image capturing apparatus and a problem therewith. In the video signal processing of the video frame N (RAW image N), steps 801 to 806 are similar to steps 301 to 306 shown in FIG. 3. Similar processing to that of step 801 to step 806 is performed on the video frame N+1 and the video frame N+2. In step 811, metadata of the lens information 403 (hereinafter, lens metadata) is generated from the information acquired from the lens. In step 812, the lens metadata N corresponding to the video frame N generated in step 811 is outputted in synchronization with a RAW image (frame N) outputted to the external device in step 806. Further, in step 813, the lens metadata N corresponding to the video frame N generated in step S811 is outputted in synchronization with the output of the developed image of the video frame N (step 805).

However, when the generation of the lens metadata N+1 takes a long time as shown in step 814, the generation of the lens metadata N+1 is not on time at the timing at which the RAW image of the video frame N+1 is outputted. Therefore, in step 815, the lens metadata N is set in relation to the video frame N+1. Then, the lens metadata N+1 corresponding to the video frame N+1 generated in step 814 is set in relation to the RAW image of the video frame N+2 in step 816. As a consequence, among the RAW image video frames that are externally outputted, those that are synchronized with the lens metadata and those that are not are mixed together.

FIG. 9 is a diagram illustrating whether or not delay adjustment of metadata according to the second embodiment is possible. As in the first embodiment (FIG. 4), the metadata 900 includes management information 401, exposure information 402, lens information 403, face detection information 404, and electronic image stabilization information 405. Column 911 indicates whether or not the delay time when the metadata is added to the video frame can be adjusted. Metadata with a ○ mark in the column 911 is metadata for which it is possible to adjust the delay time, and metadata with a × mark is metadata for which it is not possible to adjust the delay time. For metadata in which the delay time can be adjusted, the delay time can be set by a menu operation by a user (described later with reference to FIG. 11). For example, the delay time can be adjusted so that the metadata (lens metadata) of the lens information 403 is always added to a video frame differing by the same amount. By this adjustment, the amount of difference between the lens metadata and the video frame becomes constant, and the variation in the timing of the lens metadata as described with reference to FIG. 8 is reduced or eliminated. In FIG. 9, whether or not adjustment of the delay time is possible is set for individual metadata such as a focus position and a zoom position, but whether or not adjustment of the delay time is possible may be set in units of the exposure information 402, the lens information 403, and the like.

For the metadata 900 of the present embodiment, the delay time can be adjusted for metadata for which there is the possibility that the setting for RAW video to be externally outputted will not be on time. For example, it is possible to set a delay time for metadata that will be on time in some cases and will not be on time in other cases for externally outputting a video frame of a RAW video, such as the lens metadata (lens information 403) described above. By the delay time being set, the corresponding metadata will be stably outputted together with a video frame differing by a predetermined number of frames. For example, by a user setting a delay time so that a situation where a state in which the lens metadata is not synchronized with the video frame and a state in which the lens metadata is synchronized with the video frame are coexisting will not occur, the amount of difference of the metadata with respect to the video frame can be made constant.

Figure 10:
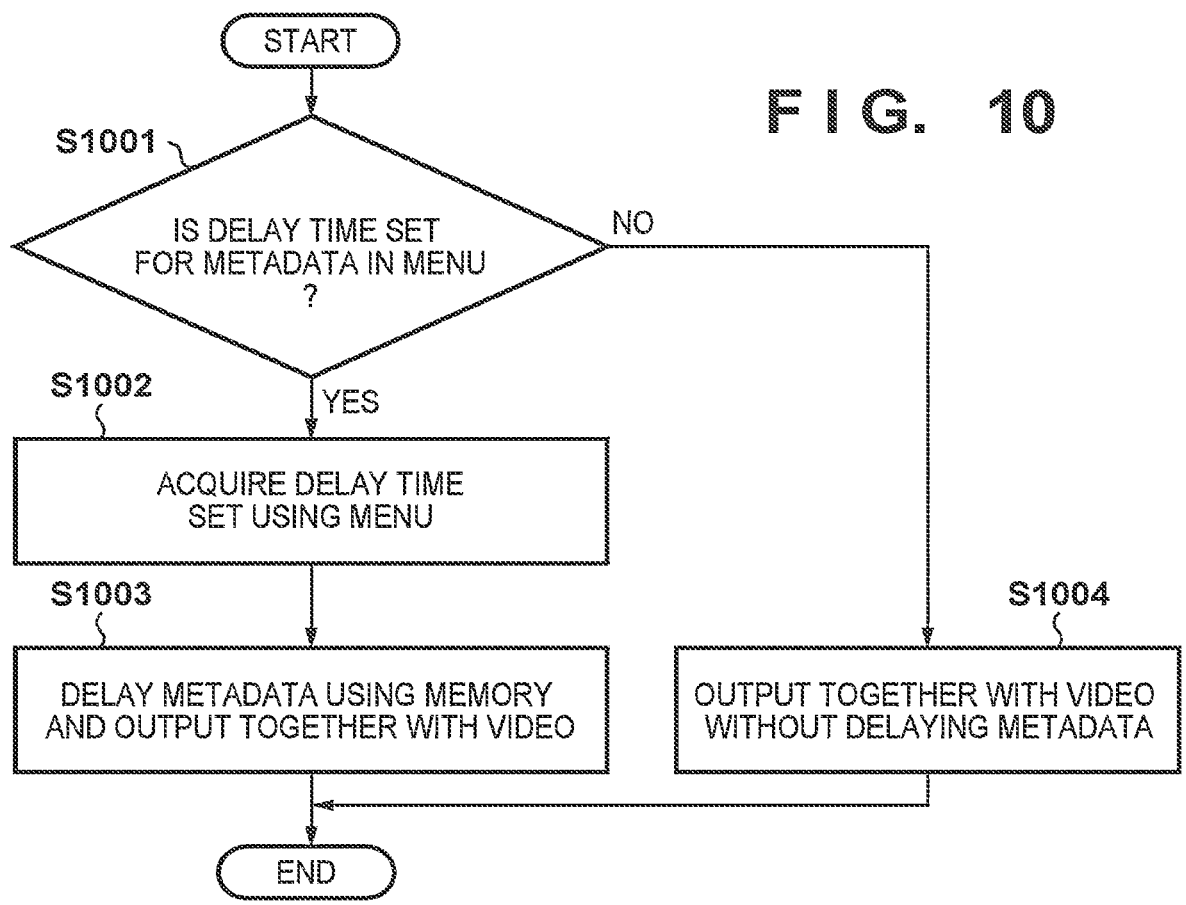
FIG. 10 is a flowchart illustrating processing of video output by the image capturing apparatus according to the second embodiment.

FIG. 10 is a flowchart illustrating processing of video output by the image capturing apparatus 100 according to the second embodiment. In the image capturing apparatus 100 according to the second embodiment, the user can select the metadata delay time by a menu operation. In step S1001, the system control unit 109 determines whether the metadata delay time has been set by a user menu operation. In a case where the system control unit 109 determines that the metadata delay time has been set (YES in step S1001), the system control unit 109 advances the process to step S1002. In step S1002, the system control unit 109 acquires the delay time that has been set by the menu operation with respect to the corresponding metadata. In step S1003, the system control unit 109 delays the addition of the metadata to the video frame based on the delay times acquired in step S1002. More specifically, for example, the metadata is treated as incomplete (generation incomplete) until the set delay time has elapsed from when the generation of the metadata completes. Thus, the system control unit 109 outputs the metadata together with the video frame from a timing delayed by the delay time from when the generation actually completes. Meanwhile, in a case where in step S1001 the system control unit 109 determines that a metadata delay time has not been set (NO in step S1001), the system control unit 109 advances the process to step S1004. In step S1004, the system control unit 109 outputs that metadata together with the video frame as soon as the generation of the metadata completes, without delaying the metadata as described above. The processing of the above step S1001 to step S1003 is performed for all the metadata.

As described above, according to the second embodiment, since the delay time can be set for predetermined metadata, the amount of difference of the metadata with respect to the video frame can be made constant. Therefore, in the configuration using the frame delay amount described in the first embodiment, it is possible to more reliably associate video frames with metadata.

Figure 11:
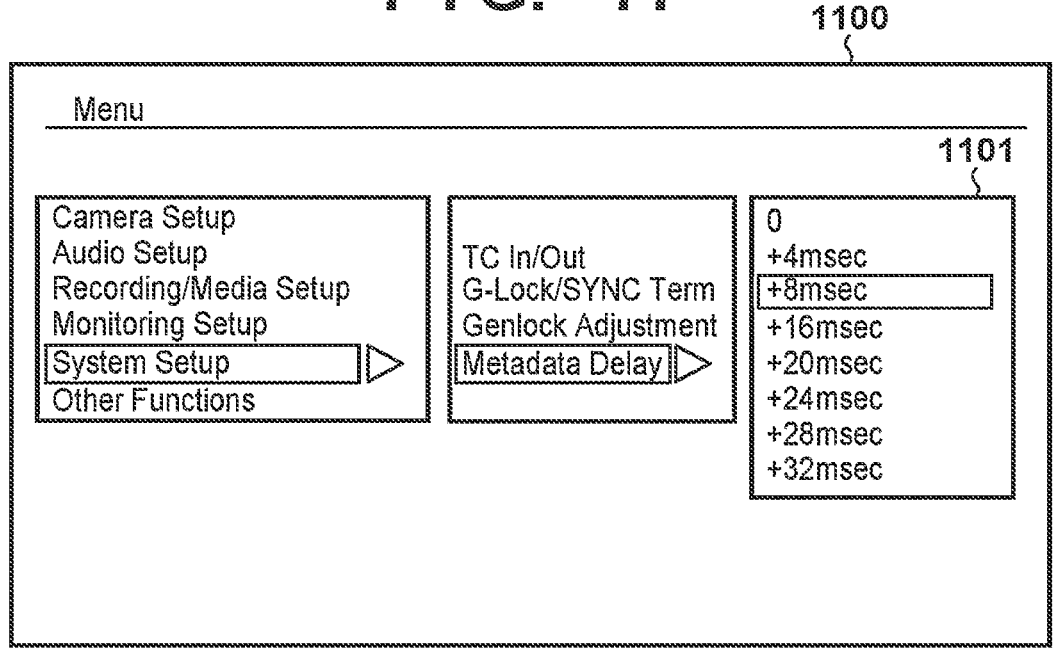
FIG. 11 is a diagram illustrating an example of a GUI for setting a delay of metadata.

FIG. 11 is a diagram illustrating a menu configuration (GUI: Graphical User Interface) for when a user selects a delay time of predetermined metadata by a menu operation. The user can set the delay time of the metadata from a list 1101 by sequentially selecting "System Setup" and "Metadata Delay" in a menu screen 1100 displayed on the display unit 111. In the menu screen 1100 of FIG. 11, the same delay time, specified from the list 1101, is set for the metadata for which it has been set that the delay amount is adjustable in FIG. 9, but the present invention is not limited thereto. The delay time may be set individually for metadata for which the delay time is adjustable. Further, the delay time may be set by time information such as a time code.

Figure 12:
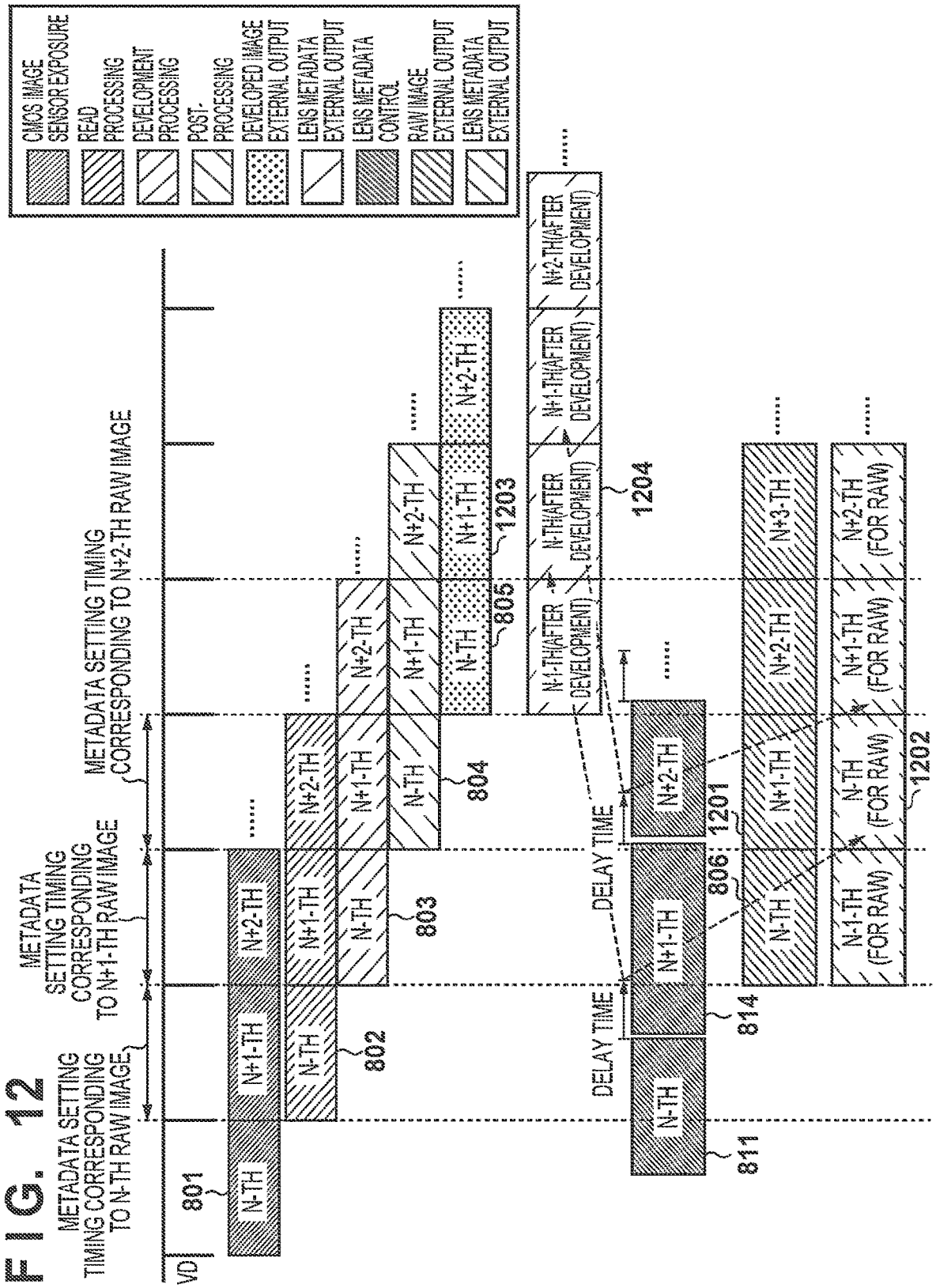
FIG. 12 is a diagram for explaining a flow of video signal processing in the image capturing apparatus according to a second embodiment.

FIG. 12 is a diagram for explaining a flow of video processing in the present embodiment. FIG. 12 illustrates an operation in a case where a delay time is set for metadata by a user's menu operation, as illustrated in FIG. 11. In FIG. 8, the synchronized lens metadata N is set for RAW image N, but the lens metadata N is also set for RAW image N+1. In contrast, in FIG. 12, since the delay time of the metadata is set by the user, the lens metadata N is set in step 1202 for RAW image N+1 outputted in step 1201. That is, lens metadata delayed by one frame is set for the video. By delaying the lens metadata in this manner, it is possible to set lens metadata which is uniformly delayed by one frame for images are set to the same frame images (the N+1th RAW image output of step 1201 and the N+1th developed image output of step 1203). However, as an external output of the developed image shown in FIG. 12, lens metadata synchronized as shown in FIG. 8 may be set (lens metadata N may be added to the developed image N). Also, the possibility of there being cases where the image in synchronism with the lens metadata and cases where they are not in synchronism, depending on the frame of the RAW image is reduced or eliminated.

As described above, according to the second embodiment, by the user setting the delay time of the metadata from the menu with respect to the metadata, it is possible to synchronize the metadata with the video with a fixed amount of difference. Thus, for example, in the image processing apparatus 600 described in the first embodiment, it is possible to correctly associate metadata when editing a video or CG-synthesizing a video.

Third Embodiment

In the configuration illustrated in FIG. 1, the camera body 121 performs periodical communication (hereinafter, periodic communication) with the interchangeable lens 120 via the electric contact unit 118, and acquires data in units of frames from the interchangeable lens 120. However, when the frame rate of the video captured by the camera body 121 increases, the periodical communication between the interchangeable lens 120 and the camera body 121 ceases to be on time, and the data of the interchangeable lens 120 cannot be acquired for all the frames in some cases. In such a case, in order to give priority to acquiring the data of the interchangeable lens 120 at a certain cycle, the communication cycle between the interchangeable lens 120 and the camera body 121 is made slower than the frame cycle. Japanese Patent Laid-Open No. 2017-219591 discloses a technique for performing communication at an appropriate frequency according to the communication processing capability of a lens by determining the communication processing capability of the attached lens in the lens-interchangeable image capturing apparatus and determining the acquisition cycle of the lens data based on the determination result and the operation cycle. Note that the communication processing capability of the attached interchangeable lens 120 can be acquired by measuring the data communication time transmitted from the interchangeable lens 120.

The occupancy rate which is the time that communication processing occupies per unit time tends to increase due to the improvement in image capture control and increase in frame rate. Therefore, it is necessary to consider an internal processing time of the camera body 121 of storage, distribution, or the like of the received lens data. Japanese Patent Laid-Open No. 2017-219591 describes measuring data communication times transmitted from lens. However, simply measuring such a data communication time does not enable accurate ascertainment of the time required for data acquisition, and there is a possibility that it will not be possible to appropriately set the communication frequency between the interchangeable lens 120 and the camera body 121. In the following third and fourth embodiments, a configuration will be described in which the time required for data acquisition is accurately ascertained in consideration of the lens processing capability and the camera processing capability, so that communication with the lens can be performed at an appropriate frequency.

Figure 16A:
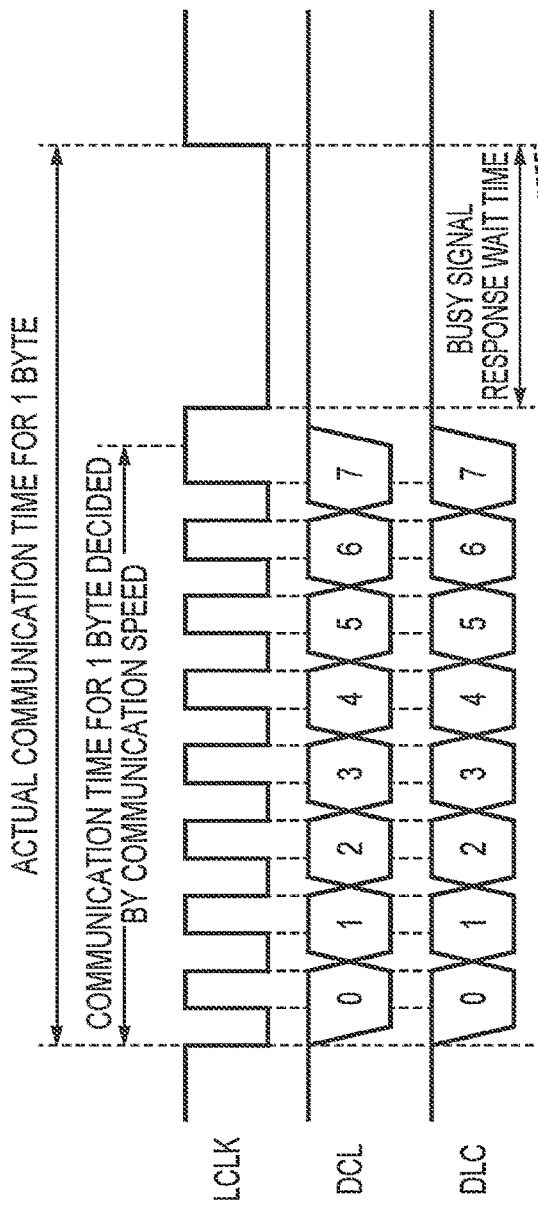
FIGS. 16A and 16B are diagrams for explaining clock-synchronized serial communication.

An example of a communication method between the interchangeable lens 120 and the camera body 121 that can be used in the third embodiment will be described with reference to FIG. 15A and FIG. 16A.

<Communication Method>

A communication method between the interchangeable lens 120 and the camera body 121 includes asynchronous and clock-synchronized serial communication. In the present embodiment, any method may be used. Although a communication method other than the two communication methods described above may be used, the two representative communication methods will be described in the present embodiment.

FIG. 15A is a diagram illustrating asynchronous serial communication between the camera body 121 and the interchangeable lens 120. As shown, no clock signal lines for synchronization are provided. In asynchronous serial communication, when one word of information is transmitted, a start bit is added before the word to be transmitted, and a synchronization signal called a stop bit is added thereafter. The start bit and the stop bit synchronize communication between the transmission side apparatus and the receiver apparatus. A DCL is a communication line for transmitting commands or data from the camera body 121 to the interchangeable lens 120. A DLC is a communication line for the camera body 121 to receive data from the interchangeable lens 120.

Next, clock-synchronized serial communication will be described with reference to FIG. 16A. FIG. 16A illustrates a signal in clock-synchronized serial communication between the camera body 121 and the interchangeable lens 120. As shown, three communication lines are used in clock-synchronized serial communication. LCLK is a communication line that transmits a synchronizing clock signal (hereinafter simply referred to as a clock signal) outputted from the camera body 121 to the interchangeable lens 120. A DCL is a communication line for transmitting commands or data from the camera body 121 to the interchangeable lens 120 in synchronization with a clock signal. A DLC is a communication line for receiving data from the camera body 121 to the interchangeable lens 120 in synchronization with a clock signal. Electrical contacts (camera terminals/lens terminals) corresponding to the three communication lines of LCLK, DCL, DLC respectively are provided in the electric contact unit 118 in each of the camera body 121 and the interchangeable lens 120.

In the clock-synchronized serial communication, since the clock signal is output from the camera body 121, the camera body 121 determines the timing at which the communication is performed. However, in the interchangeable lens 120, after receiving data from the camera body 121, it is not possible to perform the next communication in conjunction with performing communication processing such as analysis of the received command and processing generated in association therewith. Therefore, the interchangeable lens 120 needs to notify the camera body 121 that the communication process is being performed. Therefore, the interchangeable lens 120 forcibly lowers LCLK to Low during the communication process so that the communication cannot be performed during that time. That is, the interchangeable lens 120 switches the setting of LCLK terminal from the input to the output and outputs Low to LCLK (BUSY signal in FIG. 16A), thereby prohibiting the serial communication during the period in which the communication cannot be performed. After completion of the communication process, the interchangeable lens 120 returns LCLK to High and switches the setting of LCLK terminal from the output to input to allow serial communication.

<Lens Data Recording>

Figure 13:
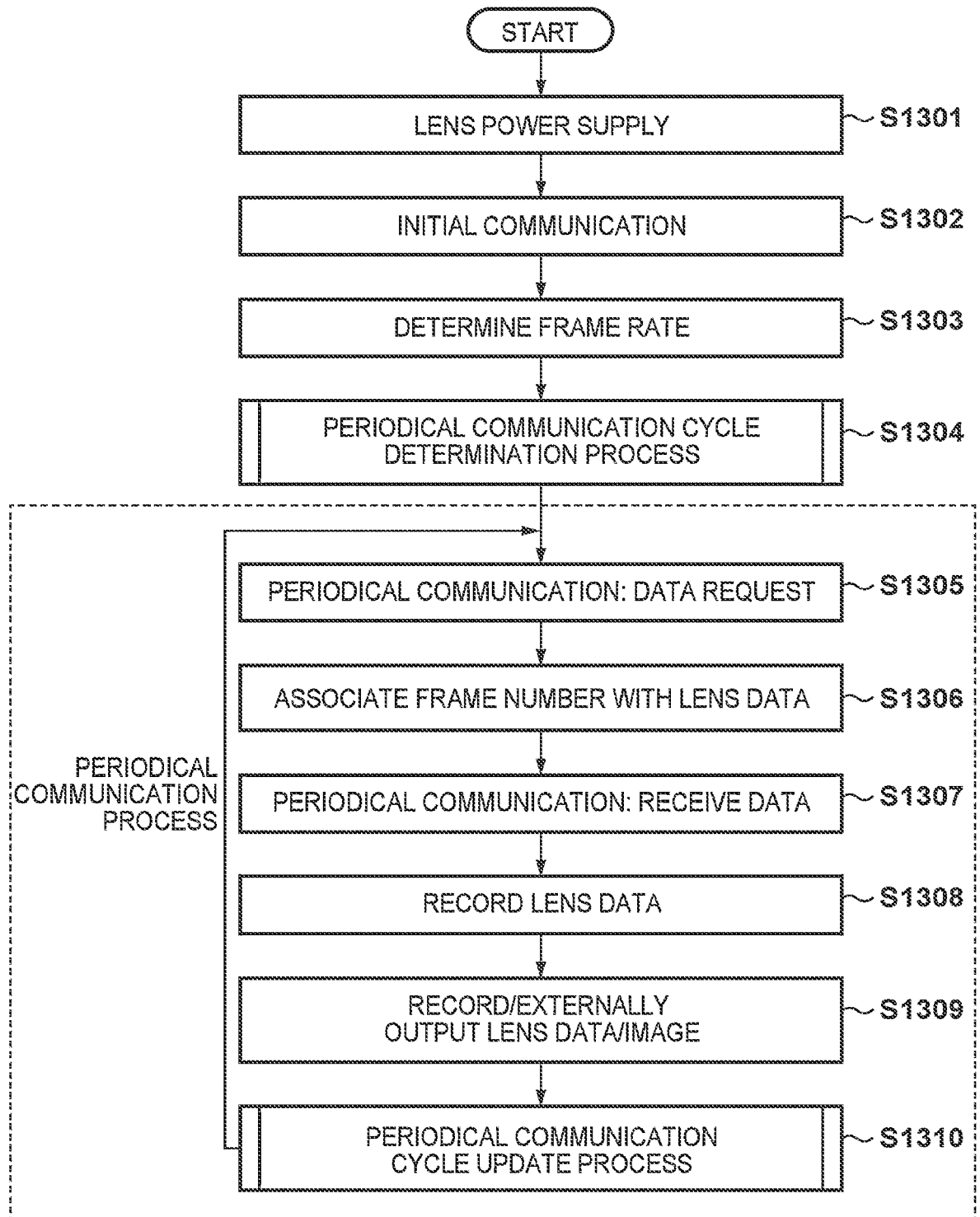
FIG. 13 is a flowchart for explaining a lens data recording process according to a third embodiment.

Next, the recording of the lens data in the present embodiment will be described with reference to the flowchart of FIG. 13. The processing of the flowchart illustrated in FIG. 13 is realized by the processor of the system control unit 109 executing a computer program (software) stored in a memory (for example, the second memory unit 114). After the camera body 121 is powered on and the camera body 121 is activated, the system control unit 109 mainly executes the processing of FIG. 13. That is, the process of FIG. 13 starts immediately after the camera body 121 is activated in a state where the interchangeable lens 120 is connected, or after the interchangeable lens 120 is connected in a state where the camera body 121 is activated.

When power is supplied to the interchangeable lens 120 in step S1301, the system control unit 109 performs an initial communication in step S1302. In the initial communication, for example, performance information and identification information are exchanged between the interchangeable lens 120 and the camera body 121. Examples of the performance information include communication rate information corresponding to the interchangeable lens, and the speed that an actuator of a zoom lens or a focus lens is able to drive the lens and drive resolution information thereof. Examples of the identification information include lens-specific ID information and attachment information of an accessory such as an extender. In step S1303, the system control unit 109 determines the image capturing cycle (frame rate of the video) of the image capture unit 106 based on the information set via the operation unit 115.

In step S1304, the system control unit 109 determines the cycle of the periodical communication performed with the interchangeable lens 120 (cycle determination process of the periodical communication). Periodical communication is performed between the camera body 121 and the interchangeable lens 120 via the electric contact unit 118 at a determined cycle. By the periodical communication, for example, lens information and internal status information of the interchangeable lens 120 used by a function (hereinafter, also referred to as a camera function) of the camera body 121 such as AF, AE, and image processing are periodically acquired. In the present embodiment, examples of the lens information used by the camera function include a focus lens position, a driving speed, a focal length, an open F value, a subject distance, a driving amount and a position of the image stabilizing lens, and information used for various image corrections. Examples of the internal status information of the interchangeable lens 120 include information such as an operation state of the lens 101 including the focus lens, the zoom lens, and the image stabilizing lens controlled by the lens control unit 117, and the aperture 104. Hereinafter, the lens information and the internal status information are collectively referred to as lens data. The periodical communication cycle is determined such that, for example, the lens data is updated in conjunction with the frame rate of the video. Information obtained from the interchangeable lens 120 in the periodical communication is stored in a predetermined region by the system control unit 109 as an image capturing parameter associated with the image data. Details of the cycle determination process in step S1304 will be described later with reference to FIG. 14A.

The cycle of the periodical communication is determined in step S1304 based on the information obtained by the initial communication of step S1302 described above. However, the cycle of the periodical communication determined in the cycle determination process of step S1304 is an initial value, and is updated as needed in step S1310 (cycle update process) to be described later. In step S1305 to step S1309, the system control unit 109 obtains lens data by periodical communication with the interchangeable lens 120. The system control unit 109 stores the lens data obtained by the periodical communication of step S1305 to step S1309 in a predetermined region of the memory together with the video signal from the image signal processing circuit 107 as an image capturing parameter associated with the video frame. For example, the second memory unit 114 may be used as such a memory.

Periodical communication between step S1305 and step S1309 will be described. When the periodical communication is started, in step S1305, the system control unit 109 transmits a command for requesting data from the camera body 121 to the interchangeable lens 120. In step S1306, the system control unit 109 associates the current frame number with the frame number to be allocated when the lens data is received from the interchangeable lens 120. In step S1307, the system control unit 109 receives the lens data transmitted by the interchangeable lens 120 in response to the command. Then, in step S1308, the system control unit 109 temporarily records the lens data received in step S1307 as metadata in a memory (for example, the second memory unit 114) by allocating the frame numbers associated in step S1306. In step S1309, the system control unit 109 records the video signal and the metadata including the lens data in the recording medium 112 in association with each other and externally outputs the metadata based on the frame number associated in step S1306.

In step S1310, the system control unit 109 performs a periodical communication cycle update process. In the periodical communication cycle determination process in step S1304, an initial value at the time of starting the periodical communication is set immediately after the camera body 121 is activated or after the interchangeable lens 120 is connected. Meanwhile, the cycle update process of step S1310 is performed in the cycle of the set periodical communication, and the cycle of the periodical communication is updated as needed. The reason why the cycle update process of the periodical communication is periodically performed as described above is as follows. There is a possibility that the response time will increase in conjunction with the lens processing load increasing due to actuator control such as autofocus, aperture, and image stabilization of the interchangeable lens 120. In addition, there is a possibility of causing problems such as a loss of data occurring due to a communication failure caused by an increase in contact resistance due to aging degradation of a junction part of the camera body 121 and the interchangeable lens 120 or an individual variability, and the video signal ceasing to be associable with the metadata including the lens data. By periodically performing the cycle determination process and dynamically changing the communication cycle, it is possible to more reliably associate the metadata with the video signal. Details of cycle update process for the periodical communication in step S1310 will be described later with reference to FIG. 14B.

<Periodical Communication Cycle Determination Process/Cycle Update Process>

Figure 14A:
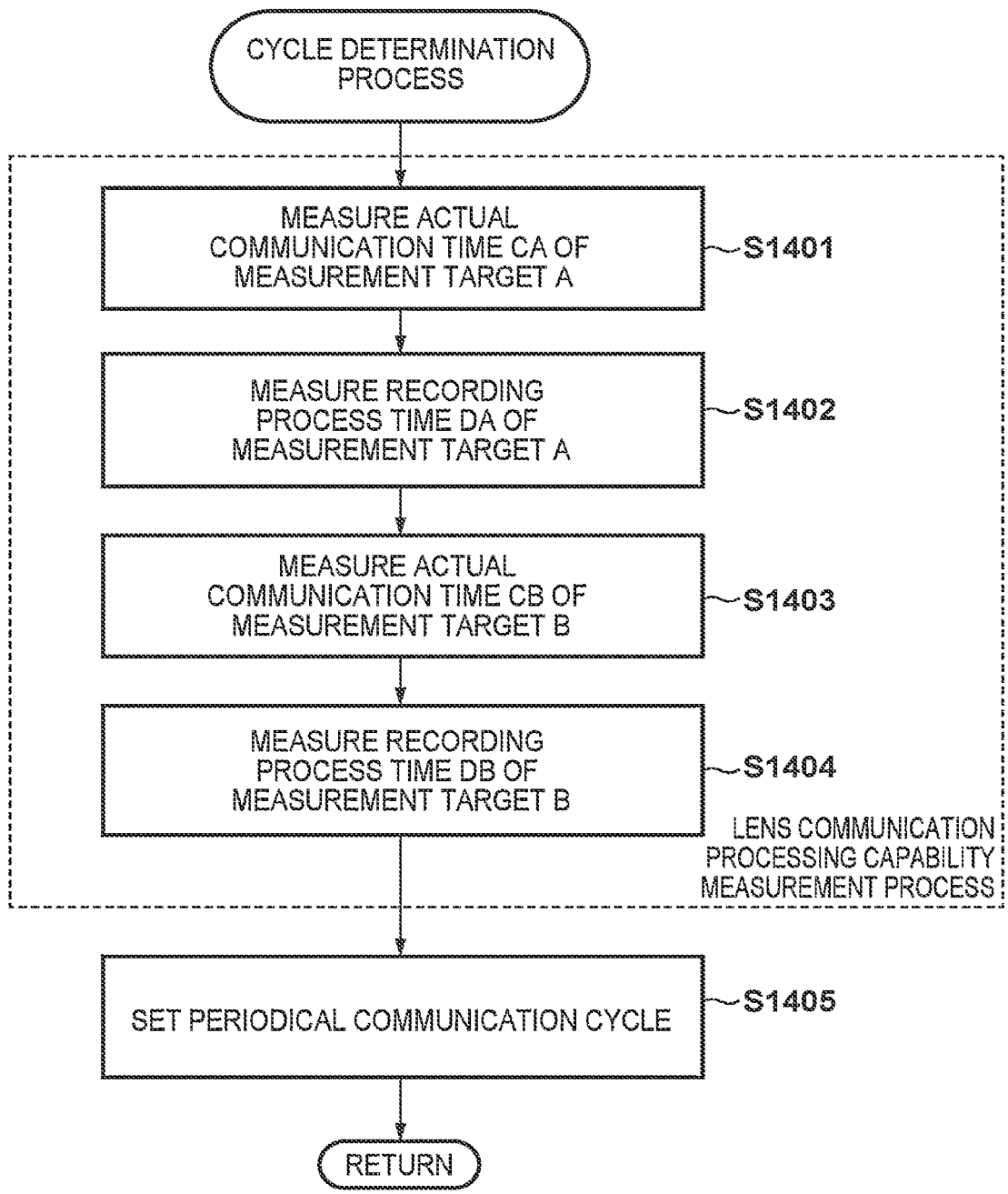
FIGS. 14A and 14B are flowcharts illustrating a periodical communication cycle determination process/cycle update process.

The cycle determination process executed in step S1304 of FIG. 13 will be described with reference to FIG. 14A. The cycle update process executed in step S1310 will be described using FIG. 14B.

The camera body 121 acquires the communication speed of the interchangeable lens 120 in the initial communication (step S1302), and communicates with the interchangeable lens 120 using the communication speed. However, the time required for actual communication (actual communication time) cannot be determined only by the communication speed of the interchangeable lens 120. For example, the duration from when the interchangeable lens 120 receives a command to when data is transmitted (response wait time) varies depending on the processing capability of the interchangeable lens 120. In addition, the time required to temporarily record the lens data received from the interchangeable lens 120 (a recording process time) varies depending on the processing capability of the camera body 121. When the communication period of the periodical communication is determined, it is necessary to consider the response wait time and the recording process time. Therefore, in the cycle determination process and the cycle update process of the periodical communication in the present embodiment, the camera body 121 actually performs predetermined communication at a predetermined timing, and measures a communication capability between the interchangeable lens 120 and the camera body 121.

In the present embodiment, assuming that lens data required for VFX is acquired as the main camera function, the communication of the following information is given as an example of a measurement target A and a measurement target B in the cycle determination process/cycle update process.

Measurement target A (also referred to as lens data A): Internal status information indicating an internal state of the interchangeable lens 120 (an angle of view, a subject distance, and the like).

Measurement target B (also referred to as lens data B): lens information used for image processing depending on the photographic lens, such as distortion correction and ambient light amount correction.

The periodical communication cycle determination process performed after the initial communication (step S1304 in FIG. 13) will be described with reference to the flowchart of FIG. 14A. In step S1401 and step S1402, the system control unit 109 measures the processing time required for the measurement target A. In step S1401, the system control unit 109 starts time measurement, and then transmits a command to the interchangeable lens 120 to request the information of the measurement target A, and waits for a response from the interchangeable lens 120. Upon receiving the information of the measurement target A by the response from the interchangeable lens 120, the system control unit 109 ends the time measurement. The system control unit 109 records the thus measured time as the actual communication time CA of the measurement target A. Next, in step S1402, after the time measurement is started, the system control unit 109 temporarily records the information of the measurement target A received from the interchangeable lens 120 in a predetermined recording region, and ends the time measurement. The system control unit 109 records the thus measured time as a recording process time DA of the measurement target A.

Next, in step S1403 and step S1404, the system control unit 109 measures the processing time required for the measurement target B. In step S1403, the system control unit 109 starts time measurement, and then transmits a command to the interchangeable lens 120 to request the information of the measurement target B, and waits for a response from the interchangeable lens 120. Upon receiving the information of the measurement target B by the response from the interchangeable lens 120, the system control unit 109 ends the time measurement. The system control unit 109 records the thus measured time as the actual communication time CB of the measurement target B. In step S1404, after the time measurement is started, the system control unit 109 temporarily records the information of the measurement target B received from the interchangeable lens 120 in a predetermined recording region, and ends the time measurement. The system control unit 109 records the duration thus measured as the recording process time DB of the measurement target B, and advances the processing to step S1405.

In step S1405, the system control unit 109 sums the times CA, DA, CB, and DB measured in step S1401 to step S1404, and calculates the total communication time. The system control unit 109 compares the frame cycle (image capture time) of the frame rate determined in step S1303 with the total communication time, and when the total communication time is shorter than the frame cycle, sets the communication period of the periodical communication to the frame cycle. On the other hand, in a case where the total communication time is longer than the frame cycle, the communication period of the periodical communication is set to the minimum integer multiple of the frame cycle that is longer than the total communication time.

The method of setting the communication period for the periodical communication is not limited to the above-described time, and may be set to a cycle longer than the measured total communication time. Although the flowchart of FIG. 14A assumes that there are two pieces of information to be measurement targets, the present invention is of course not limited thereto. The flowchart is similar in the case where there are three or more measurement targets, and configuration may be such that the actual communication time and the recording process time are measured for all the measurement targets, and the total time is used as the "total communication time".

Figure 14B:
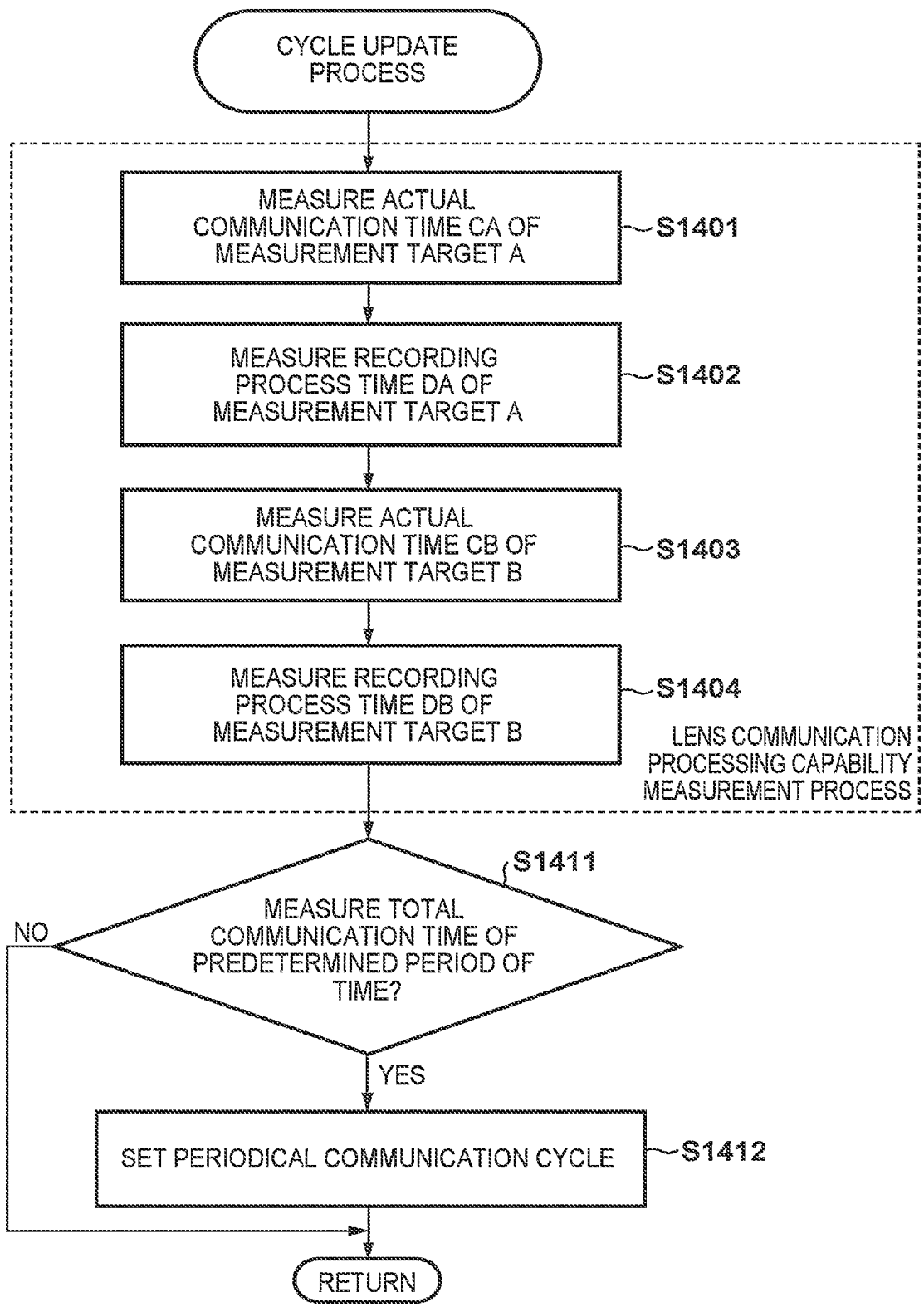

Next, the periodical communication cycle update process according to step S1310 of FIG. 13 will be described with reference to the flowchart of FIG. 14B. The processing of step S1401 to step S1404 is similar to the processing described in FIG. 14A. However, the communication processing time and the recording process time measured in step S1401 to step S1404 are obtained by measuring the time of the communication processing and the recording processing executed in step S1307 to step S1308.

In step S1411, the system control unit 109 determines whether or not the measurement according to step S1401 to step S1404 has been performed over a predetermined period. In a case where the system control unit 109 determines that the measurement has been performed over the predetermined period (YES in step S1411), the system control unit 109 advances the process to step S1412. Meanwhile, if it is determined that the measurement has not yet been performed over the predetermined period (NO in step S1411), the system control unit 109 skips step S1412 and ends the process. The reason for determining whether the measurement has been performed over the predetermined period of time is to obtain a stable measurement result.

If the confirmation of step S1411 is not performed, the system control unit 109 decides and updates the periodical communication cycle for each frame cycle in step S1412. Therefore, even when an abnormal measurement value is suddenly detected, a process for adjusting the periodical communication cycle to the abnormal measurement value will be performed. Therefore, there is the possibility that the periodical communication cycle will not be stable, and the association between the video signal and the lens data will become complicated. By confirming that the measurement result is stable after a predetermined period of time has elapsed, it is possible to determine the update cycle stably without responding unnecessarily even if an abnormal measurement value is detected suddenly. Specifically, in step S1411, the system control unit 109 determines whether the communication processing time has been measured for a predetermined time or has been measured a predetermined number of times. In step S1412, the system control unit 109 determines the communication period of the periodical communication when the communication is stable, based on the result of measuring the predetermined time or the number of times (for example, by statistically processing the total communication time measured a plurality of times). For example, the system control unit 109 determines the communication period of the periodical communication using the median value of plural total communication times acquired from a plurality of measurement results. Alternatively, for example, the system control unit 109 may exclude a predetermined number of largest measurement values and smallest measurement values from a plurality of measurement results, and determine the communication cycle of the periodical communication using a value obtained by averaging the remaining measurement values. With such a process, an appropriate update cycle can be determined even when the actual communication time becomes longer due to an increase in processing load due to lens AF, aperture control, or the like, or when the actual communication time is different due to a command difference from the initial communication.

Next, detailed measurement details of the actual communication times CA and CB (and CC) and the recording process times DA and DB (and DC) performed in step S1401 to step S1404 in FIGS. 14A and 14B will be described with reference to FIG. 15B and FIG. 16B.

Figure 16B:
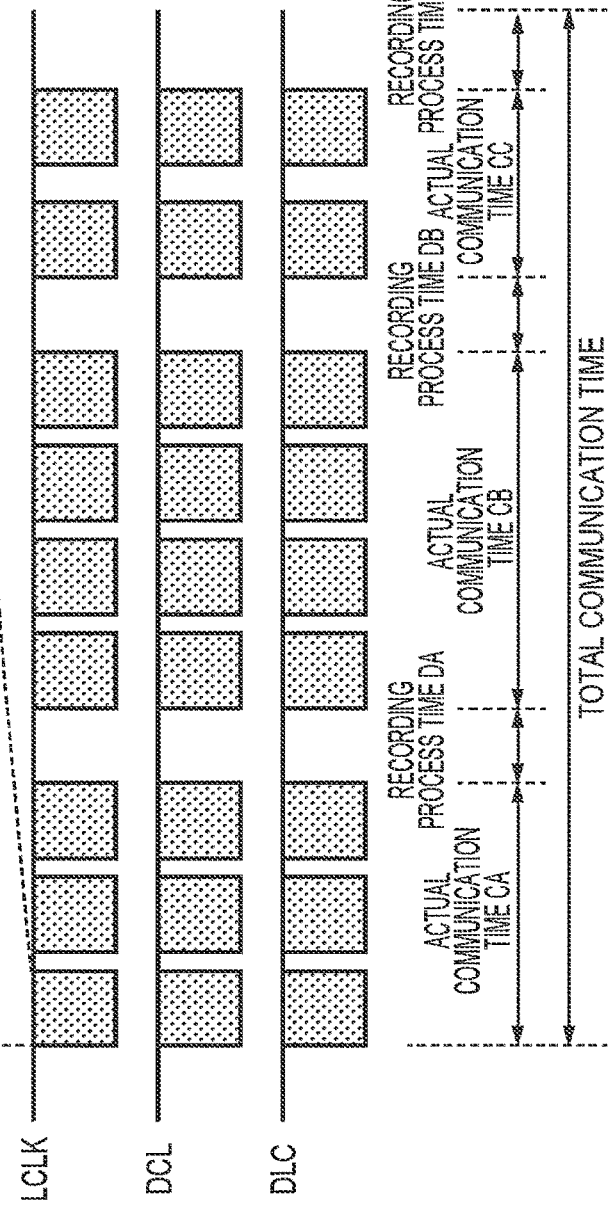

FIG. 15B and FIG. 16B show communication processing for obtaining lens data of measurement targets A, B, and C from the interchangeable lens 120. As illustrated in FIG. 15B and FIG. 16B, the system control unit 109 acquires the individual information of the measurement targets A to C from the interchangeable lens 120 by using a communication command including a plurality of byte sequences. The communication processing time required to acquire the information of the measurement targets A, B, and C is the sum of the actual communication times CA, CB, and CC of the communication command and the recording process times DA, DB, and DC, respectively. For example, FIG. 15B shows measurement of communication time in the case of asynchronous communication. In FIG. 15B, the communication command for acquiring the information of the measurement target A is 4 bytes of data, the communication command for acquiring the information of the measurement target B is 5 bytes of data, and the communication command for acquiring the information of the measurement target C is composed of 2 bytes of data. When a command (1 byte) requesting the information of the measurement target A transmitted from the camera body 121 is received by the interchangeable lens 120, a response wait time is generated in order to prepare lens data to be transmitted. The communication processing time of the measurement target A is measured by measuring the actual communication time CA from the transmission of the command for requesting the information of the measurement target A until the reception of the information of the measurement target A (3 bytes) is completed, and the recording process time DA required until the received information is temporarily recorded. It is similar for the other measurement targets B and C. By summing the communication processing times required to acquire the measurement targets A, B, and C, the total communication time used for determining or updating the communication cycle of the periodical communication is obtained.

For example, FIG. 16B shows measurement of the communication processing time in the case of clock-synchronized communication. Note that in FIG. 16B, a situation of a configuration in which the communication command for acquiring the information of the measurement target A is 3 bytes of data, the communication command for acquiring the information of the measurement target B is 4 bytes of data is illustrated. A BUSY signal is outputted from the interchangeable lens 120 every one byte. The communication processing time of the measurement target A is obtained by measuring the actual communication time CA, which is from the transmission of the first command for acquiring the information of the measurement target A until BUSY signal of the final command is released, and the recording process time DA, which is required for the temporary recording of the received lens data. It is similar for the other measurement targets B and C. As described above, the communication processing time of each measurement target is composed of the actual communication time and the recording process time, and means the time from the start of the communication for acquiring the information of each measurement target until the next communication becomes possible. The system control unit 109 determines the communication cycle of the periodical communication based on the total communication time obtained by summing the communication processing times measured in the above-described procedure.

In the case where the processing capability of the camera body 121 or the interchangeable lens 120 is low or in the case of a high frame rate, the measurement target total communication time (the total of the actual communication time and the recording process time) may be longer than the frame rate. When such an interchangeable lens 120 is connected, the time required for communication crosses the next vertical synchronizing signal, and the association with the video signal for each frame is lost. This makes it impossible to perform CG synthesis using lens data synchronized with the frame, resulting in CG synthesis that is different from the live-action video. Therefore, in a case where the total communication time is longer than the frame rate, the lens data is acquired at a stable constant cycle by slowing down the cycle of the periodical communication.

Next, the following CASE1 to CASE4 will be described with reference to FIG. 17A through FIG. 17D.

CASE1: A case where the total communication time is shorter than the frame cycle CASE2: A basic process of a case where the total communication time is longer than the frame cycle CASE3: A case that improves the accuracy of lens data in CASE2

CASE4: A case where the communication time is 2 or more times the frame cycle in CASE3

Figure 17A:
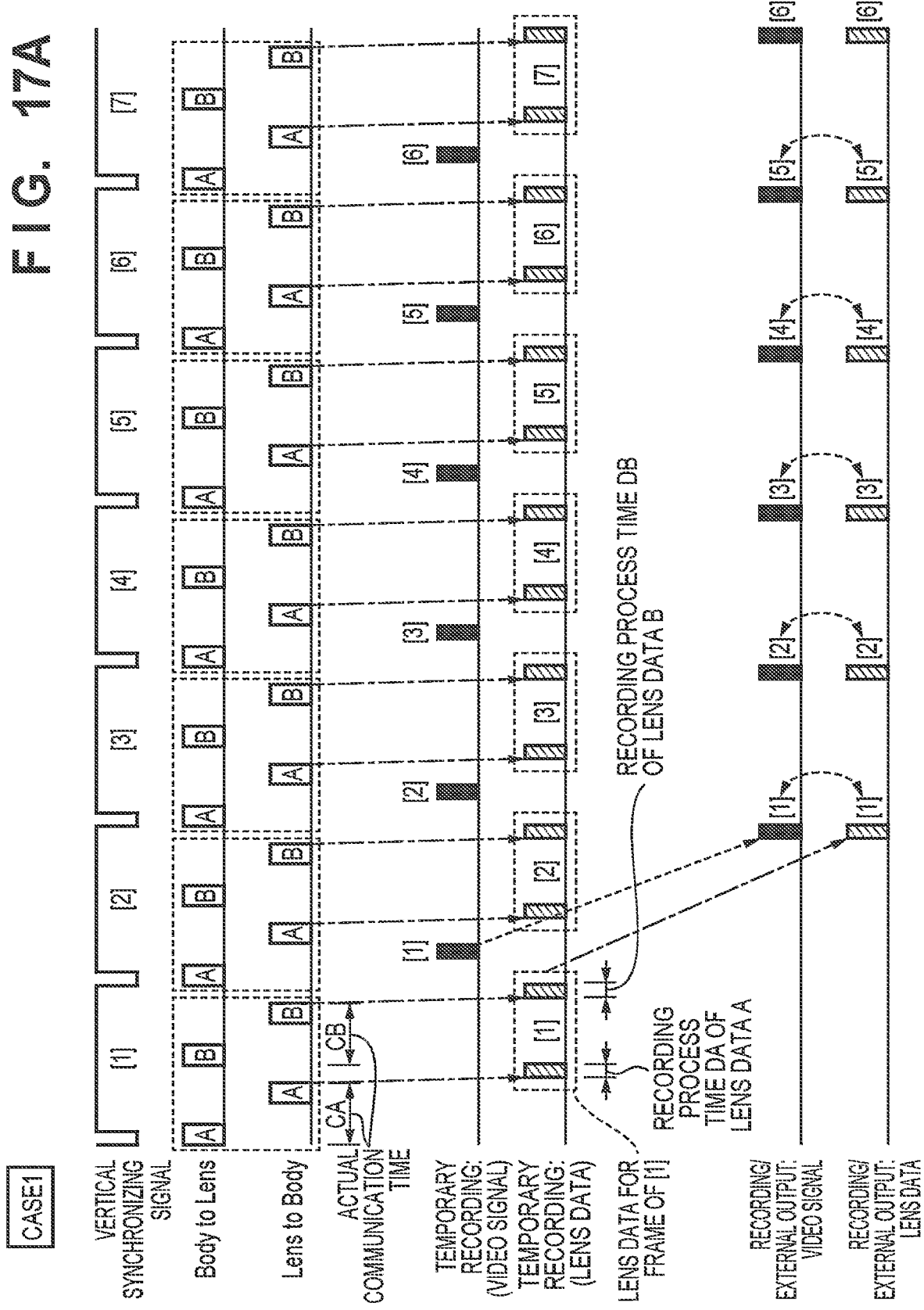

First, CASE1 will be described with reference to FIG. 17A. [1] to [7] in the row of the vertical synchronizing signal in the figure represent the number of the frame, and the data numbered [1] to [7] in subsequent rows represent data related to the frame of the same number. The data A and B described in "Body to Lens" and "Lens to Body" lines are periods in which communication commands for requesting and receiving information (lens data A and B) of the measurement targets A and B described above are transmitted and received. A dashed-line frame surrounding A and B indicates that the set of lens data A and B is information acquired from the interchangeable lens 120 for one frame.

[1] to [6] in the line of "temporary recording: video signal" are processes in which the system control unit 109 temporarily records the video signals of frames [1] to [6] in the memory in the first memory unit 108. [1] to [7] in the line of "temporary recording: lens data" are processes in which the system control unit 109 temporarily records the lens data corresponding to frames [1] to [7] in the memory in the second memory unit 114. The actual communication times CA and CB are times measured in step S1401 and step S1403. Further, the recording process time DA of the lens data A and the recording process time DB of the lens data B are times measured in step S1402 and step S1404. In CASE1, the total communication time (the total time of the actual communication time and the recording process time of all the lens data) falls within one frame, and the lens data synchronized with the video signal can be recorded at the timing of the subsequent frame. [1] to [6] in the lines of "recording/external output: video signal" and "recording/external output: lens data" are processes for recording video signals and lens data corresponding to frames [1] to [6]. Video signals and lens data of frames [1] to [6] are recorded and externally outputted at the same timing. In other words, in CASE1, the video signal and the lens data of the respective frames are recorded/externally outputted in synchronization with each other.

As described above, in CASE1, the communication for acquiring the lens data A and B (the information of the measurement targets A and B) is performed every frame cycle, and is associated with the video signal. Therefore, it is possible to perform video recording and output in which the video signal and the lens data are synchronized with each other with a minimum delay amount with respect to the reading of the video signal.

CASE2 shown in FIG. 17B is an example of a case where the total communication time (the total time of the actual communication time and the recording process time of all the lens data) does not fall within one frame. The total communication time does not fit within one frame of the video, and so, the process of temporarily recording the lens data of the frame [1] ends while the video signal of the frame [2] is being acquired. Therefore, the timing at which the lens data can be recorded/externally outputted is the timing shown in FIG. 17B. That is, by delaying the recording/external output of the video signal to a timing at which the lens data [1] corresponding to the frame [1] can be recorded/externally output, the video signal and the lens data are recorded/output in synchronization with each other. In addition, since the acquisition of the lens data of the frame [1] extends across the vertical synchronization signal, the periodical communication for the frame [2] cannot be performed. Therefore, the lens data acquired at the timing at which the next periodical communication is performed is the lens data corresponding to the frame [3], and the system control unit 109 cannot acquire the lens data for the frame [2] from the interchangeable lens 120. Accordingly, the system control unit 109 uses a copy of the lens data [1] corresponding to the frame [1] as the lens data to be recorded/externally output in synchronization with the video signal of the frame [2]. That is, the system control unit 109 uses the latest lens data among the lens data acquired by the periodical communication for the video frame before the video frame for which the periodical communication is not executed as the lens data corresponding to that video frame. In this way, omission of the lens data used for CG synthesis is prevented. In CASE2, the timing at which the video signal and the lens data are recorded is delayed by one frame from the timing of CASE1. Note that, in FIG. 17B, the latest lens data among the acquired lens data is copied and used as the lens data of the video frame in which the lens data cannot be acquired, but the present invention is not limited to this. For example, the lens data of the video frame in which the lens data cannot be acquired may be predicted by, for example, extrapolation using the latest predetermined number of pieces of lens data of the acquired lens data. As the prediction by extrapolation, for example, a simple linear prediction or an approximation of a second order or higher order based on a lens feature may be used. Further, even if the periodical communication cycle is two frames or more, similar processing to that described above can be applied.

Figure 17C:
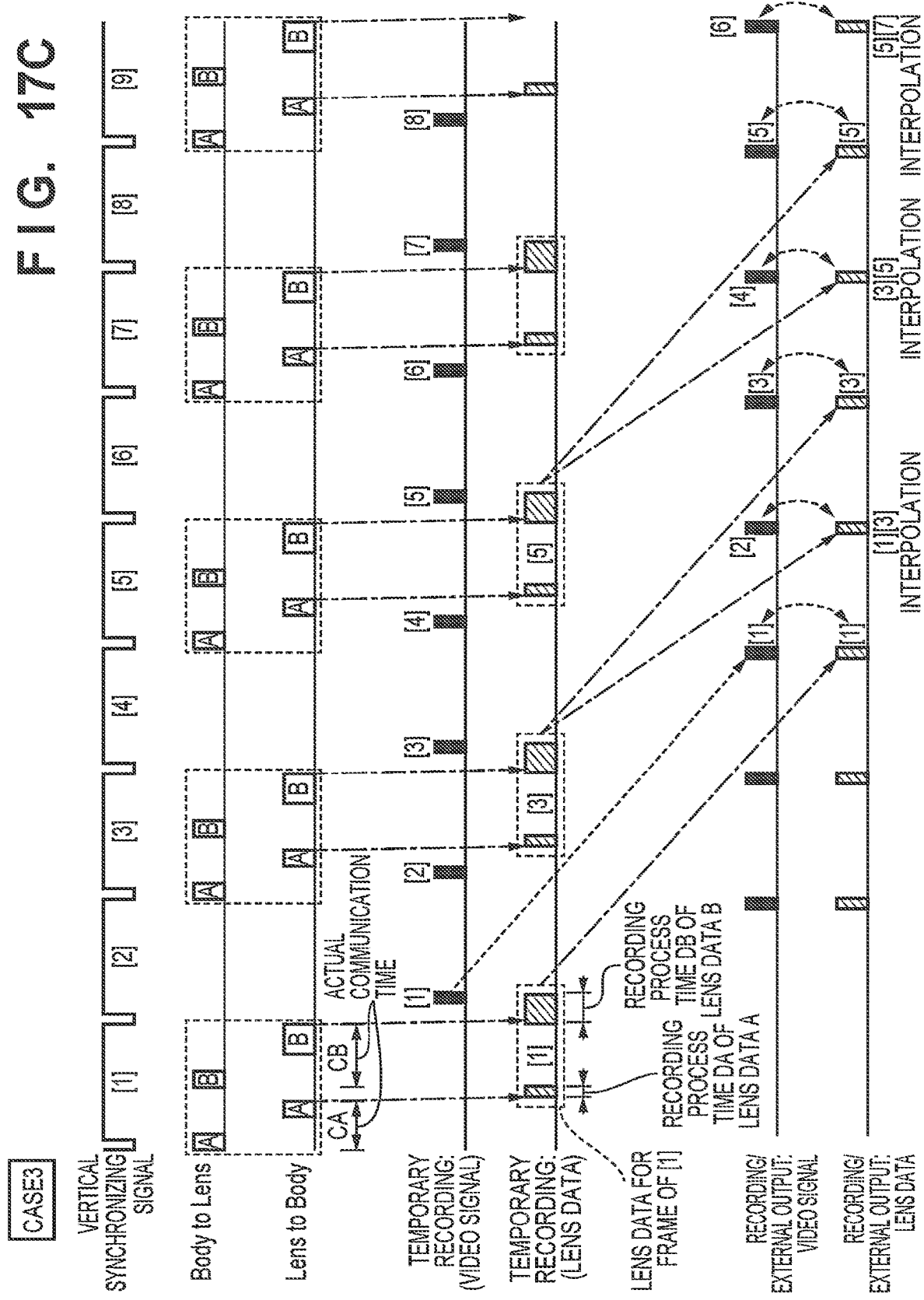

CASE3 shown in FIG. 17C, similarly to CASE2, is an example of a case where the total communication time (the total time of the actual communication time and the recording process time of all the lens data) does not fall within one frame. In CASE2, in a frame in which the lens data cannot be acquired, the lens data acquired for the previous frame is copied. However, in such a process, the lens data is the previous one in spite of the fact that the live-action video has been updated, there is a possibility that a difference will occur between the live-action video and CG video to be synthesized. In order to solve such a problem, in CASE3, lens data corresponding to a frame for which the lens data cannot be acquired is interpolated using lens data of the preceding and succeeding frames.

As an example, it is assumed that the focal length information of the lens data is 50 mm for the frame [1] and 60 mm for the frame [3]. In this case, as the lens data of the frame [2] for which the lens data cannot be acquired, the difference of CG video to be synthesized with the live-action video is reduced by recording 55 mm which is the intermediate value of the lens data obtained for the frame [1] and the frame [3] before and after the lens data. However, in order to obtain the lens data in the frame [2] by interpolation, the lens data corresponding to the frame [3] is required. Therefore, it is necessary to delay the recording/external output of the video signal in the frame [2] until the lens data of the frame [3] can be acquired. Accordingly, in CASE 3, the timing of recording the video signal and the lens data is delayed by two frames from the timing of CASE1.

In the above example, a simple linear interpolation is used, but the present invention is not limited thereto. For example, interpolation using a second order approximation or a higher order approximation based on a characteristic of the lens, or interpolation using lens data before the frame [1] may be used. Needless to say, the lens data to be interpolated is not limited to the focal length. For example, the interpolation can also be performed on parameters (lens data) related to the focus position, the subject distance information calculated from the defocus amount, the distortion amount, the peripheral light loss, and the like.

Figure 17D:
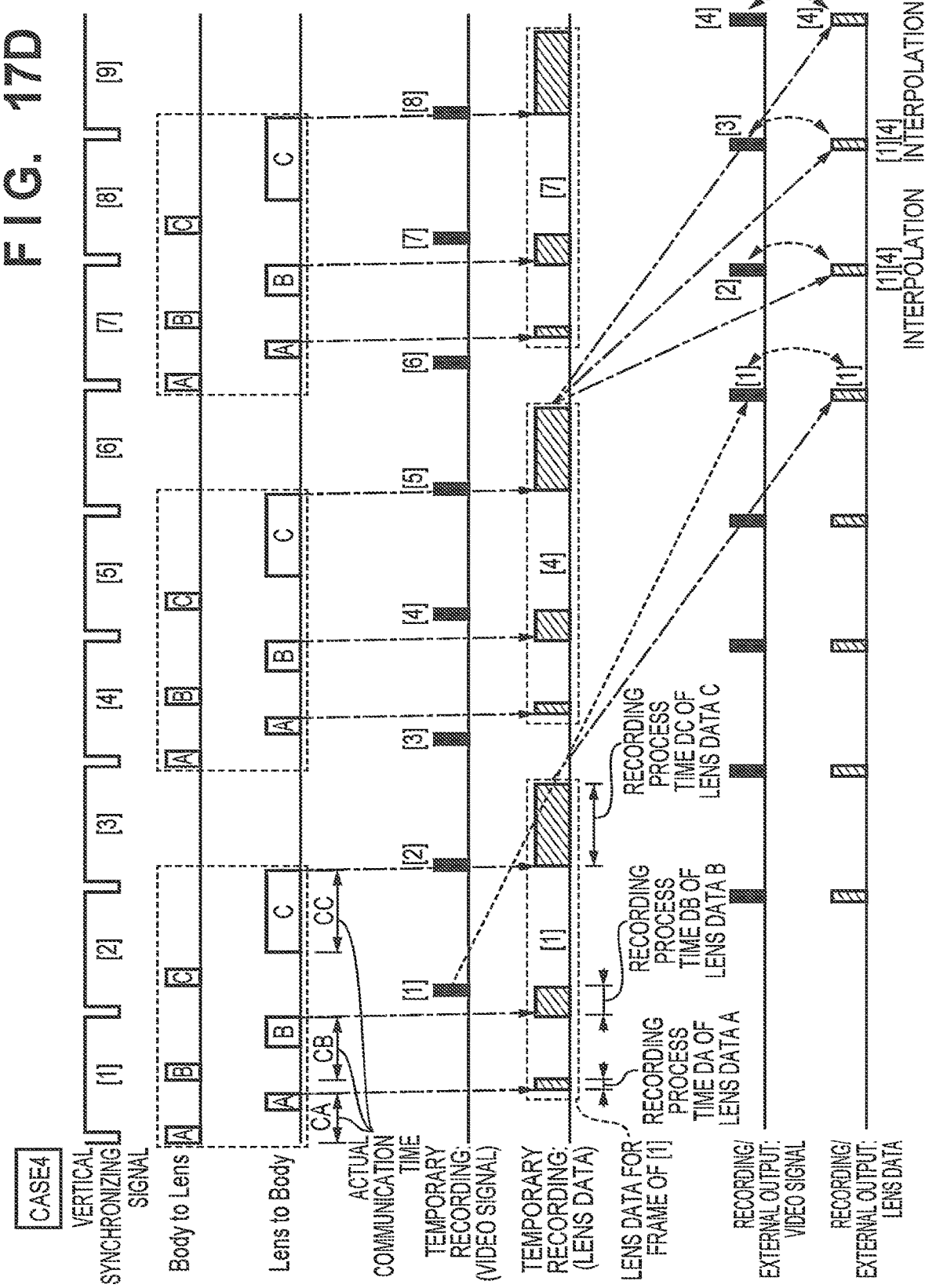

In CASE4 shown in FIG. 17D, lens data C is added to the lens data A and B as information acquired from the interchangeable lens 120 by periodical communication. In CASE4, the lens data acquired by the periodical communication does not fit within two frames but fits within three frames. In CASE3, one piece of lens data is interpolated using the lens data of the previous and subsequent frames, but in CASE4, there are two or more pieces of lens data to be interpolated.

In CASE4, the lens data of the frame [2] and the frame [3] is obtained by interpolating using the lens data of the frame [1] and the frame [4]. Therefore, it is necessary to delay the timing of the recording of the video signal in the frame [2] until the lens data of the frame [4] can be acquired. In addition, when the lens data of the frame [2] and the frame [3] are interpolated, it is necessary to interpolate the lens data of the frame [1] and the frame [4] with different weights. Specifically, it is possible to consider a method in which, in a case where the lens data of the frame [2] is interpolated, the weighting of the lens data of the frame [1] is made heavier than the weighting of the lens data of the frame [4], and when the lens data of the frame [3] is interpolated, the inverse weight is applied. Further, since the recording/external outputting of the video signal of the frame [2] needs to be delayed until the lens data of the frame [4] can be acquired as described above, the timing of recording the video signal and the lens data is delayed by 4 frames with respect to the timing of CASE1. Note that the method of interpolating the lens data in CASE4 is not limited to linear interpolation as in CASE3, and other methods may be used. Weighting determined using the characteristics of the lens may also be performed. Further, the interpolation of the lens data may be performed by the prediction using the lens data of the frame before the frame [1].

With the processing described above, even if the response time becomes longer due to an increase in the lens processing load caused by the actuator control of the lens, the lens data can be acquired at an appropriate cycle. Also, it becomes possible to stably acquire lens data even when data loss occurs due to a communication failure caused by an increase in contact resistance accompanying aging degradation of a junction part of the camera body 121 and the interchangeable lens 120 or individual variability.

Fourth Embodiment

In the third embodiment, as described with reference to FIG. 17C (CASE3) and FIG. 17D (CASE4), methods have been described in which lens data for a frame for which lens data cannot be acquired is interpolated using lens data in the previous and subsequent frames. In CASE3, in order to associate the video and the lens data, the video signal is recorded/externally outputted by delaying two frames with respect to the CASE1 timing. In CASE4, when the timing at which the lens data cannot be acquired is two consecutive frames, the video signal is recorded/externally outputted by delaying the CASE1 timing by four frames. Obviously the timing at which the video signal is recorded/externally outputted will be further delayed when the number of frames at the timing at which the lens data cannot be acquired becomes still larger.

In VFX image capturing, it is assumed that a photographer will perform camerawork while confirming the synthesized video in real time. In such a case, if there is a video delay, it is difficult to perform work when performing operations such as angle of view adjustments by panning, tilting, and zooming; focus adjustments; and the like, and there is a possibility that the operation will be hindered. This kind of problem can be solved by the fourth embodiment. Hereinafter, a video outputting process according to a fourth embodiment will be described with reference to FIG. 18A to FIG. 18C. In the fourth embodiment, the following CASE5 to CASE7 will be described. Meanwhile, the meanings of symbols and the like in the drawings in the following description are the same as those in CASE1 to CASE4 described in FIG. 17A through FIG. 17D of the third embodiment, and only parts having differences will be described.

CASE5: A basic process of a case where the communication time is longer than the framerate CASE6: A case where external output data is compensated by copying the latest lens data.

CASE7: A case where external output data is compensated by prediction of the lens data.

In CASE5 to CASE7, the process of recording/externally outputting the video signal and the process of recording/externally outputting the lens data in the third embodiment are divided into recording the video signal, externally outputting the video signal, recording the lens data, and externally outputting the lens data. As a result, the frame timings of the recorded video and the externally outputted video can be made different, and processing suitable to each of recording and external output can be performed.

Figure 18A:
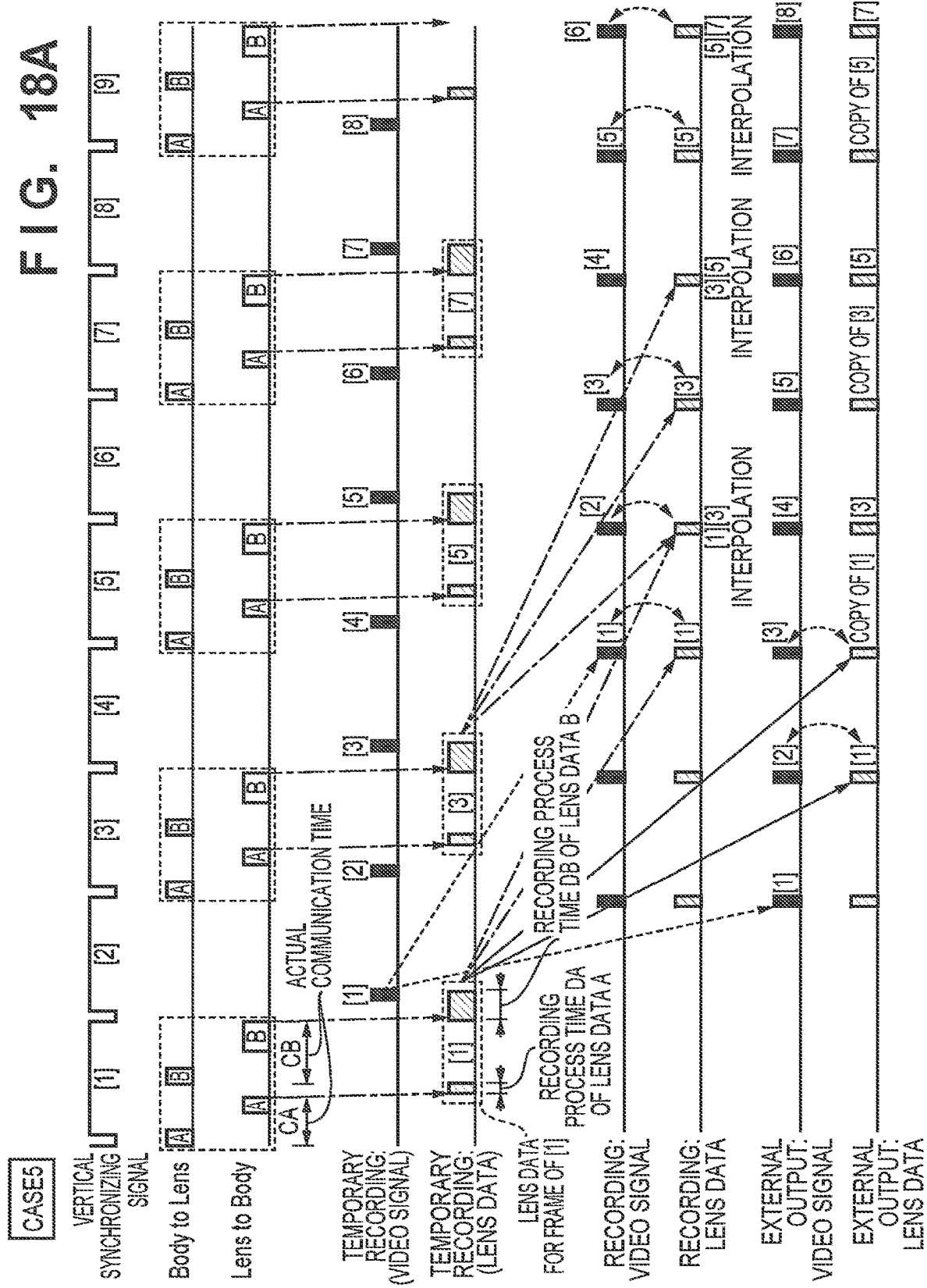

CASE5 shown in FIG. 18A illustrates a processing example of a case where the total communication time (the total time of the actual communication time and the recording process time of all the lens data) does not fall within one frame. In CASE5, lens data of a frame for which lens data cannot be acquired is interpolated with lens data of the frames before and after for which lens data can be acquired. CASE5 is an example in which the communication time falls within two frames. In CASE5, since the lens data [1] of the frame [1] ends while the video signal of the frame [2] is being acquired, the timing in which the lens data [1] can be recorded is a timing after the processing of the frame [3] has started. It is assumed that the recorded video signal and the lens data will be subjected to a process for synthesizing CG with respect to live-action video in post-production. Therefore, it is desirable that frames and lens data of the same timing be recorded in association with each other. Therefore, similarly to CASE3 of the third embodiment (FIG. 17C), the recording of the video signal is delayed until the timing at which the lens data of the frame [1] can be recorded, and the video signal and the lens data are recorded in synchronization with each other.

On the other hand, a video signal for external output is often used for camera work such as angle-of-view adjustment and focus adjustment, and video delay becomes a factor that hinders the work. Therefore, in the present embodiment, the video data to be outputted in the external output is outputted without delay. Specifically, during the processing for the frame [2] where the processing of the frame [1] has been completed, the video signal of the frame [1] is transmitted to the external I/F unit 113 to thereby perform a display to a connected external monitor or the like with little delay. In addition, the latest lens data (the lens data of the frame before the frame [1]) that has been acquired at the time of processing of the frame [2] is used as the lens data to be synchronized with the frame [1].

By the above processing, the video information and the lens data to be recorded are frame-synchronized data, and the data is suitable for post-production. Meanwhile, since the outputted data is video with little delay, real-time CG synthesis becomes possible while suppressing the effect on operations such as angle of view adjustment, focus adjustment, and the like.

CASE6 illustrated in FIG. 18B is an example of a case where the acquisition of lens data does not fit even within two frames. In CASE6, the acquisition of lens data fits within three frames, and lens data recorded in association with the frame [2] and the frame [3] is interpolated using the lens data of the frame [1] and the frame [4], similarly to CASE4 (FIG. 17D). Therefore, the video signal and the lens data are recorded in synchronization by delaying the timing of recording the video signal of the frame [2] until the lens data of the frame [4] can be acquired. On the other hand, in the external output, for example, the external output of the frame [3] is executed during the processing of the frame [4] in which the processing of the frame [3] has completed. That is, the video signal of the frame [3] is transmitted to the external I/F unit 113 during the processing of the frame [4], and is displayed on a connected external monitor or the like. Also, the lens data for the frame [1], which is the latest lens data that has been acquired at the time of processing of the frame [3], is used as the lens data to be synchronized with the frame [3]. Next, the processing of the frame [4] is completed and the video signal of the frame [4] is transmitted to the external I/F unit 113 during the processing of the frame [5]. Also, a copy of the lens data for the frame [1], which is the latest lens data that has been acquired at the time of processing of the frame [4], is used as the lens data to be synchronized with the video signal of the frame [4].

Even in a situation where the acquisition of the lens data is delayed by the above-described processing, frame synchronization between the recorded video information and the lens data is achieved, and a video for which lens data is more accurate due to interpolation of the lens data is recorded. On the other hand, the metadata to be outputted together with the video frame to be externally outputted is generated based on lens data that has been received by the periodical communication at the time of generation of the metadata (by use of the lens data that has been received). For doing so, since the externally outputted video is video with little delay, real-time CG synthesis becomes possible while suppressing the effect on operations such as angle of view adjustment, focus adjustment, and the like.

CASE7 illustrated in FIG. 18C is an example in which the data does not fit within two frames as in CASE6, and illustrates how to further improve the correctness of the lens data associated with the externally outputted video. In CASE5 and CASE6, the latest lens data copy acquired at that time is used as the lens data associated with the external output. If a copy of the lens data is used, the content of the frame of the video is updated but the metadata is not updated. For this reason, when there is CG that is being synthesized in real time using the external output, there is a possibility that a difference from the live-action video will occur, resulting in an incongruous video. An example operation for solving such a problem is shown in CASE7.

In CASE7, the process of synchronizing and recording the video signal and the lens data is similar to that of CASE6. On the other hand, for example, the video signal of the frame [3] is externally outputted by transmitting the video signal of the frame [3] to the external I/F unit 113 during the processing of the frame [4] where the processing of the frame [3] has been completed. The externally output video signal can be displayed on an external monitor or the like connected thereto. The system control unit 109 predicts the lens data to be externally output in synchronization with the frame [3] by extrapolating the lens data from the latest lens data (lens data of the frame [1]) that has been acquired during the processing of the frame [3] and the lens data that has been acquired before that. As the method of extrapolation, a simple linear prediction may be used, or an approximation of a second or higher order from a feature of the lens may be used. The number of frames used for prediction may be any number. Further, the lens data may be obtained by predicting the lens operation of the photographer using a Kalman filter or the like.

Even in a situation where the acquisition of the lens data is delayed by the above-described processing, frame synchronization between the recorded video and the lens data is achieved, and a video for which lens information is more accurate due to interpolation of the lens data is recorded. Furthermore, the metadata to be outputted together with the video frame to be externally outputted is generated by prediction or interpolation based on the lens data that has been received by the periodical communication at the time of generating the metadata. As a result, since the video to be externally outputted is a video with little delay and the lens data is also predicted information, the matching accuracy of real-time CG synthesis is improved while suppressing the effect on operations such as angle-of-view adjustment and focus adjustment.

According to the third and fourth embodiments, the lens-interchangeable image capturing apparatus can communicate with the lens at an appropriate frequency according to the communication processing capability of the lens and the image capturing apparatus processing capability.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to example embodiments, it is to be understood that the disclosure is not limited to the disclosed example embodiments. The scope of the following claims is to be accorded the broadest interpretation so as to encompass all such modifications and equivalent structures and functions.

This application claims the benefit of Japanese Patent Application No. 2022-012030, filed Jan. 28, 2022, which is hereby incorporated by reference herein in its entirety.

What is claimed is:

1. An image capturing apparatus, comprising:
an image capture element configured to capture a video;
at least one memory storing instructions; and
at least one processor that, upon executing the stored instructions, performs:
generating metadata related to the capturing by the image capture element for each video frame of the video;
setting a mode that allows a delay of a video in accordance with an operation of a user; and
outputting a video frame to which the generated metadata has been added, wherein
the generated metadata includes information indicating a delay amount based on a difference between a video frame that the generated metadata corresponds to and a video frame that is outputted after the generated metadata is added thereto in the outputting, and
the outputting of the video frame is delayed in a case where the mode has been set so that the generated metadata is added to the video frame corresponding to that metadata.

2. The image capturing apparatus according to claim 1, wherein the delay amount is a number of frames representing the difference or a time representing the difference.

3. The image capturing apparatus according to claim 1, wherein the at least one processor further performs selecting a set of metadata to be used in downstream processing among metadata generated by the generating,
wherein, in a case where the mode has been set, the video frame to be outputted is delayed until metadata for which the delay amount is largest among the metadata included in the set of metadata is added to a corresponding video frame.

4. The image capturing apparatus according to claim 3, wherein, in the generating, information indicating invalidation is added to metadata which is not included in the set of metadata and for which a delay occurs.

5. The image capturing apparatus according to claim 1, wherein the metadata includes information acquired from an attached interchangeable lens and information acquired by image processing on a video frame of the video.

6. The image capturing apparatus according to claim 1, wherein in the outputting, in a case where a delay time has been set for the generated metadata, the generated metadata is added to a video frame after the delay time has elapsed from when generation of the generated metadata has completed.

7. A method for controlling an image capturing apparatus having an image capture element configured to capture a video, the method comprising:
generating metadata related to the capturing by the image capture element for each video frame of the video;
setting a mode that allows a delay of a video in accordance with an operation of a user; and
outputting a video frame to which the generated metadata has been added, wherein
in the generated metadata, information indicating a delay amount based on a difference between a video frame that the generated metadata corresponds to and a video frame that is outputted in the outputting after the generated metadata is added thereto is included, and the outputting of the video frame is delayed in a case where the mode has been set so that the generated metadata is added to the video frame corresponding to that metadata.

8. A non-transitory computer-readable storage medium storing a program for causing a computer to execute a method for controlling an image capturing apparatus having an image capture element configured to capture a video, the method comprising:
generating metadata related to the capturing by the image capture element for each video frame of the video;
setting a mode that allows a delay of a video in accordance with an operation of a user; and
outputting a video frame to which the generated metadata has been added, wherein
in the generated metadata, information indicating a delay amount based on a difference between a video frame that the generated metadata corresponds to and a video frame that is outputted in the outputting after the generated metadata is added thereto is included, and the outputting of the video frame is delayed in a case where the mode has been set so that the generated metadata is added to the video frame corresponding to that metadata.

* * * * *